US008210617B2

(12) United States Patent
Aaron et al.

(10) Patent No.: US 8,210,617 B2
(45) Date of Patent: Jul. 3, 2012

(54) CHILD RESTRAINT SYSTEM

(75) Inventors: Mary L. Aaron, Denver, CO (US); Albert G. Aaron, Denver, CO (US)

(73) Assignee: Grandma Knows, Inc., Denver, CO (US)

( * ) Notice: Subject to any disclaimer, the term of this patent is extended or adjusted under 35 U.S.C. 154(b) by 0 days.

(21) Appl. No.: 12/434,386

(22) Filed: May 1, 2009

(65) Prior Publication Data

US 2009/0230741 A1 Sep. 17, 2009

Related U.S. Application Data

(63) Continuation-in-part of application No. 11/636,777, filed on Dec. 12, 2006.

(51) Int. Cl.
*A47C 31/00* (2006.01)
*B60R 22/00* (2006.01)
(52) U.S. Cl. ......... 297/484; 297/253; 297/465; 297/485
(58) Field of Classification Search ............... 297/250.1, 297/253, 255, 256.14, 465, 484, 485
See application file for complete search history.

(56) References Cited

U.S. PATENT DOCUMENTS

| | | | |
|---|---|---|---|
| 2,833,344 A | 5/1958 | Lucht | |
| 3,099,486 A | 7/1963 | Scott | |
| 3,115,364 A | 12/1963 | Berlin | |
| 3,321,247 A * | 5/1967 | Dillender | 297/465 |
| 3,380,776 A * | 4/1968 | Dillender | 297/484 |
| 3,834,758 A * | 9/1974 | Soule | 297/484 |
| 3,954,280 A | 5/1976 | Roberts et al. | |
| 3,992,040 A | 11/1976 | Gannac | |
| 4,009,808 A | 3/1977 | Sharp | |
| 4,026,245 A | 5/1977 | Arthur | |
| 4,099,770 A * | 7/1978 | Elsholz et al. | 297/216.11 |
| 4,226,474 A * | 10/1980 | Rupert et al. | 297/484 |
| 4,428,514 A | 1/1984 | Elf | |
| 4,601,667 A | 7/1986 | Hull | |
| 4,674,800 A | 6/1987 | Ensign | |
| 4,927,211 A * | 5/1990 | Bolcerek | 297/465 |
| 4,976,494 A | 12/1990 | Polley | |
| 5,188,421 A | 2/1993 | Arseneault | |
| 5,292,175 A | 3/1994 | Artz | |
| 6,049,954 A | 4/2000 | Britto | |

(Continued)

OTHER PUBLICATIONS

Non-Final Rejection dated May 29, 2007, U.S. Appl. No. 11/636,777, 8 pages.

(Continued)

*Primary Examiner* — David Dunn
*Assistant Examiner* — Philip Gabler
(74) *Attorney, Agent, or Firm* — Dorsey & Whitney LLP

(57) ABSTRACT

A child restraint system (CRS) offers a safe, compact, configuration flexible, and easy to use restraint for a small child in a vehicle or aircraft. The child is secured in a five-point harness attached to a framework. The framework is in turn attached to latches secured to the vehicle or aircraft. The CRS may be configured in forward-facing or rearward-facing orientations depending on the size and age of the child. Further, the CRS harness may be equipped with a swaddle vest for securing especially young or small children that are too small for the standard five-point harness. Finally, the CRS harness may be attached to a headrest anchor that is situated between a seat and a corresponding headrest when no other suitable latches are available.

11 Claims, 21 Drawing Sheets

U.S. PATENT DOCUMENTS

| | | | |
|---|---|---|---|
| 6,182,931 | B1 | 2/2001 | Richard |
| D455,546 | S | 4/2002 | Norman |
| 6,364,417 | B1 | 4/2002 | Silverman |
| 6,402,241 | B1 | 6/2002 | Mazzotti et al. |
| 6,767,058 | B2 | 7/2004 | McClellan-Derrickson |
| 6,820,902 | B2 | 11/2004 | Kim |
| 6,857,700 | B2 | 2/2005 | Eastman et al. |
| 6,877,809 | B2 | 4/2005 | Yamazaki et al. |
| 6,893,088 | B2 | 5/2005 | Kassai et al. |
| 6,916,066 | B2 | 7/2005 | Sedlack |
| 7,004,541 | B2 | 2/2006 | Sedlack |
| 7,131,703 | B1 | 11/2006 | Sheridan et al. |
| 7,210,707 | B2 | 5/2007 | Schroth |
| 7,347,494 | B2 * | 3/2008 | Boyle et al. .................. 297/253 |
| 2008/0136235 | A1 | 6/2008 | Aaron |

OTHER PUBLICATIONS

Informal or Non-Responsive Amendment dated Jul. 19, 2007, U.S. Appl. No. 11/636,777, 30 pages.

Notice to the Applicant Regarding a Non-Compliant or Non-Responsive Amendment dated Jul. 26, 2007, U.S. Appl. No. 11/636,777, 2 pages.

Amendment/Request for Reconsideration after Non-Final Rejection dated Aug. 16, 2007, U.S. Appl. No. 11/636,777, 45 pages.

Notice to the Applicant Regarding a Non-Compliant or Non-Responsive Amendment dated Oct. 24, 2007, U.S. Appl. No. 11/636,777, 3 pages.

Amendment/Request for Reconsideration after Non-Final Rejection dated Nov. 8, 2007, U.S. Appl. No. 11/636,777, 31 pages.

Notice to the Applicant Regarding a Non-Compliant or Non-Responsive Amendment dated Jan. 28, 2008, U.S. Appl. No. 11/636,777, 4 pages.

Amendment/Request for Reconsideration after Non-Final Rejection dated Apr. 28, 2008, U.S. Appl. No. 11/636,777, 85 pages.

Final Rejection dated Aug. 4, 2008, U.S. Appl. No. 11/636,777, 19 pages.

Amendment Submitted/Entered with Filing of CPA/RCE dated Oct. 3, 2008, U.S. Appl. No. 11/636,777, 24 pages.

Advisory Action dated Oct. 30, 2008, U.S. Appl. No. 11/636,777, 4 pages.

Request for Continued Examination (RCE) dated Nov. 4, 2008, U.S. Appl. No. 11/636,777, 8 pages.

Non-Final Rejection dated Dec. 31, 2008, U.S. Appl. No. 11/636,777, 14 pages.

Amendment/Request for Reconsideration after Non-Final Rejection dated Mar. 31, 2009, U.S. Appl. No. 11/636,777, 49 pages.

Final Rejection dated Oct. 29, 2009, U.S. Appl. No. 11/636,777, 6 pages.

Amendment Submitted/Entered with Filing of CPS/RCE dated Jan. 29, 2010, U.S. Appl. No. 11/636,777, 39 pages.

Advisory Action dated Feb. 16, 2010, U.S. Appl. No. 11/636,777, 3 pages.

Amendment Submitted/Entered with Filing of CPA/RCE dated Mar. 1, 2010, U.S. Appl. No. 11/636,777, 14 pages.

Non-Final Rejection dated Mar. 9, 2010, U.S. Appl. No. 11/636,777, 20 pages.

Amendment/Request for Reconsideration after Non-Final Rejection dated Jun. 9, 2010, U.S. Appl. No. 11/636,777, 21 pages.

Non-Final Office Action dated May 12, 2011, U.S. Appl. No. 11/636,777, 7 pages.

Final Office Action dated Sep. 2, 2010, U.S. Appl. No. 11/636,777, 12 pages.

Amendment and Response to Final Office Action dated Nov. 2, 2010, U.S. Appl. No. 11/636,777, 20 pages.

* cited by examiner

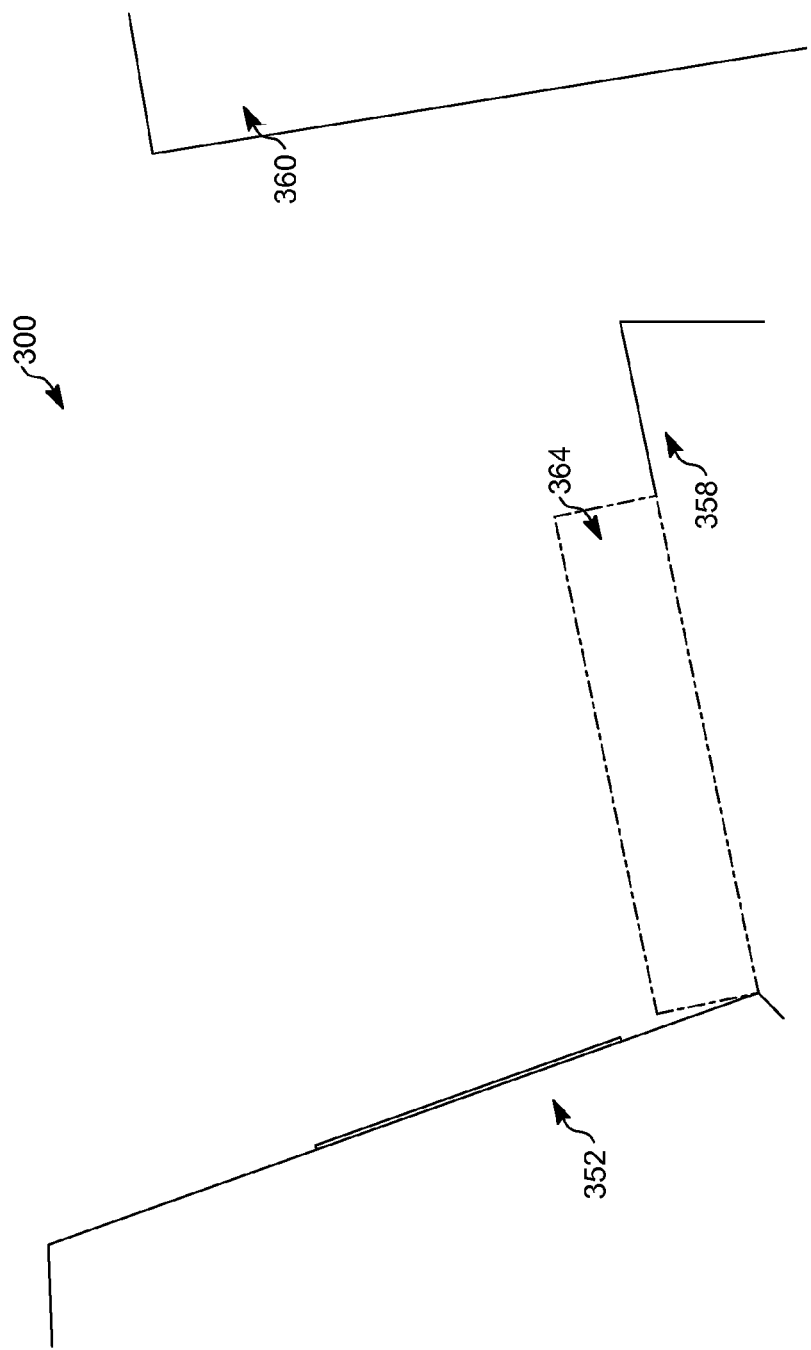

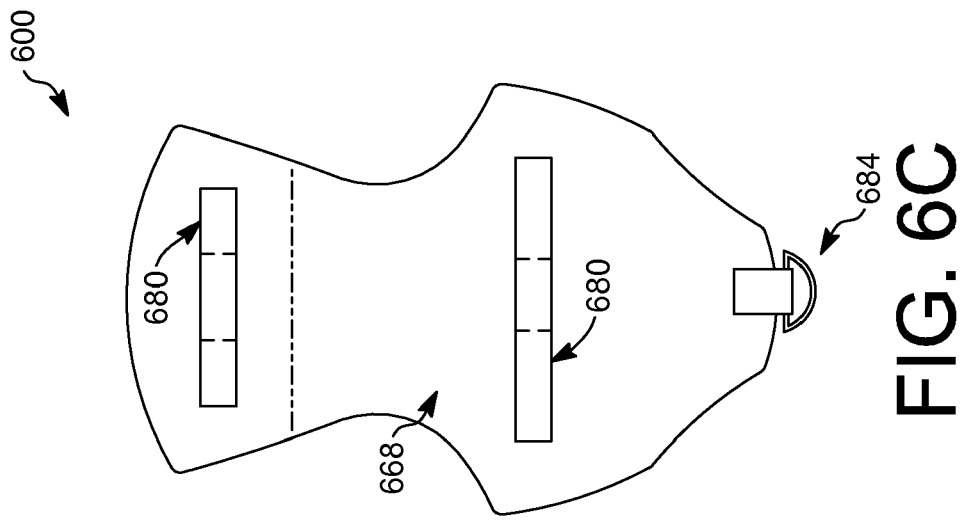
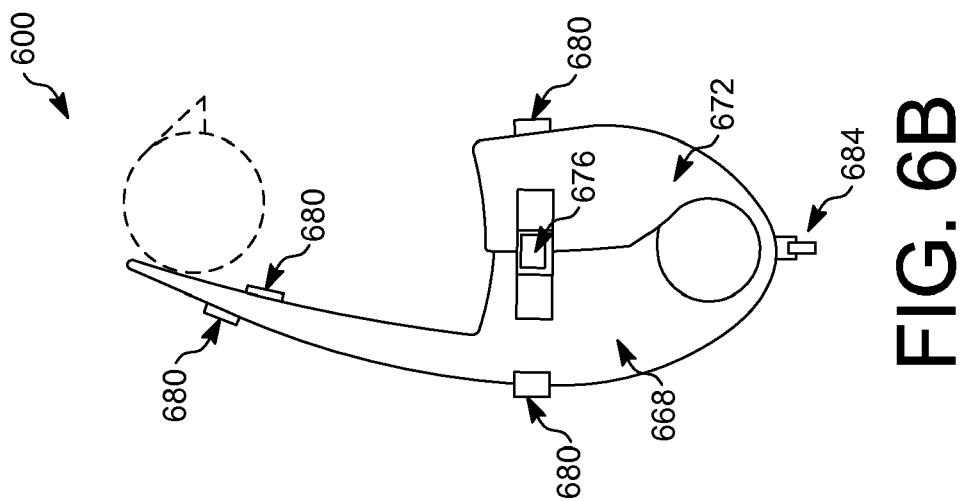
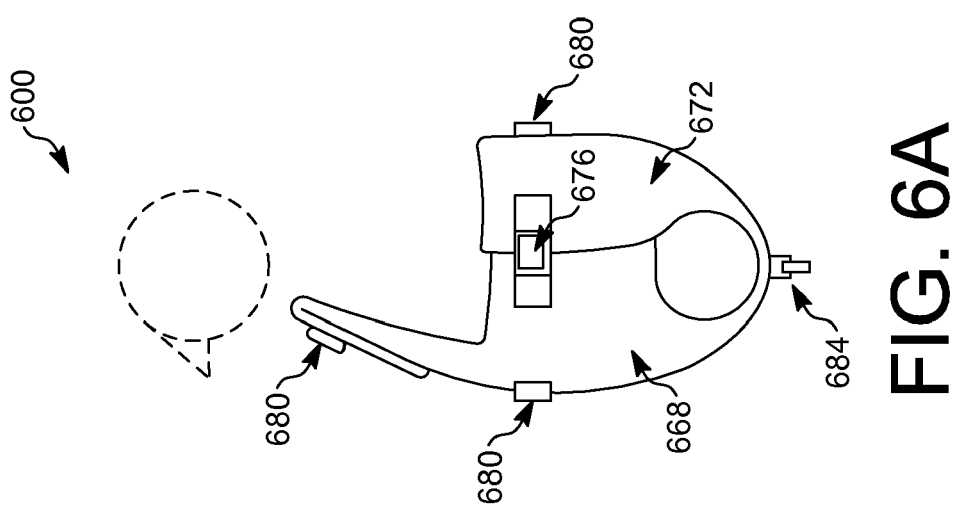

CHILD RESTRAINT SYSTEM

RELATED APPLICATIONS

This application is a continuation-in-part of U.S. Pat. Ser. No. 11/636,777, entitled "Child Harness Restraint," filed Dec. 12, 2006 and incorporated herein by reference for all that it discloses and teaches.

BACKGROUND

Manufacturers of motor vehicle components and accessories sold in the U.S.A. must conform and certify compliance with Federal Motor Vehicle Safety Standards (FMVSS) issued through the National Highway Traffic Safety Administration (NHTSA). FMVSS 213 contains requirements for child restraint systems used in motor vehicles and aircraft. FMVSS 213 defines a Child Restraint System (CRS) as any device, except Type I or Type II seat belts, designed for use in a motor vehicle or aircraft (collectively hereinafter a "vehicle") to restrain, seat, or position children who weigh 66.1 lbs. or less. Further, various state laws and regulations have been enacted that require the use of certain types of CRSs such as rear-facing infant car seats, forward-facing infant car seats, and booster seats when restraining children of certain weights and/or ages.

The American Academy of Pediatrics has advised the medical profession that over thirty percent of infants are either too small or too large for a standard child car seat. As a result, these children are at increased risk for apnea, bradycarda, and oxygen desaturation when restrained in a standard child car seat while being transported in a vehicle as required by FMVSS 213 and the various state laws and regulations.

Over ten million rigid child car seats have been recalled with various problems that may compromise the safety of the restrained child. Further, it takes over thirty hours of training to be qualified to install a rigid infant car seat correctly. In addition, it often takes at least one hour for even a qualified person to properly install a rigid infant car seat in a vehicle. As a result, over ninety percent of child car seats are installed incorrectly due to a lack of installation training, a lack time to correctly install the child car seat, and/or the incompatibility of numerous vehicle mounting locations and seat configurations with the present hard shell CRSs.

Further, many hard shell CRSs are installed using OEM seatbelts. More specifically, a lap belt secures a bottom portion of the hard shell CRS and a shoulder belt secures an upper portion of the hard shell CRS. However, the single shoulder belt's diagonal orientation fails to prevent the back of the hard shell CRS from shifting with respect to the vehicle seat when the vehicle comes to an abrupt stop.

Additional concerns with the present hard shell CRSs include the weight and portability of the child car seats. These child car seats are often bulky and may weigh up to 18 lbs. Further, such child car seats may be difficult to carry and install due to their size and/or weight. Still further, individuals such as the elderly and other persons with limited physical strength may be unable to lift and carry bulky and/or heavy child car seats.

The average weight of a hard seat CRS is approximately 18 lbs. Therefore, taking into account the weight of the CRS, the maximum weight of a restrained child is reduced significantly. In the event of an accident, a lighter CRS allows standard automotive child restraint latches to survive faster crash speeds and/or a heavier restrained child. Further, the presence of a heavy hard shell seat creates an increased possibility that in the event of an accident, the seat may break loose and become airborne, potentially causing injuries.

SUMMARY

A vehicle child restraint system (CRS) for forward and/or rear facing installations is presently disclosed. The CRS may include various features to restrict the movement of the restrained child and adjust the orientation of the CRS, for example, a swaddle vest, a booster seat, body containment bumper, head guard, and a vehicle headrest anchor. The CRS may also utilize the vehicle manufacturer installed tether latches, if available, for installation.

The CRS described herein avoids the use of a hard shell seat and provides safe and effective restraint for children of various sizes and ages. The CRS may encompass forward and/or rear facing configurations that allow children of various sizes and ages to be comfortably protected without jeopardizing their safety. One implementation of the CRS is quickly and easily installed by a user without technical training. Another implementation of the CRS weighs less than a standard child car seat, thus allowing the CRS to restrain a heavier child without exceeding the capacity of the manufacturer installed child restraint latches. Yet another implementation of the CRS meets all applicable requirements of the NHTSA 49 CFR 571 standards.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

BRIEF DESCRIPTION OF THE DRAWINGS

FIG. 3A is an elevation view of an example front-facing CRS incorporating a booster seat positioned on top of a vehicle seat.

FIG. 6A is a left side elevation view of an example front-facing swaddle vest to be used in conjunction with a CRS.

FIG. 6B is a left side elevation view of an example rear-facing swaddle vest to be used in conjunction with a CRS.

FIG. 6C is a front elevation view of an example swaddle vest to be used in conjunction with a CRS.

DETAILED DESCRIPTION

A child restraint system (CRS) used to safely secure a child in a motor vehicle or aircraft (collectively hereinafter a "vehicle") is disclosed herein. The CRS may be forward-facing, rear-facing, or both depending on the user's configuration of the CRS and applicable laws and regulations. The CRS may include a framework of straps and/or belts configured to secure a harness containing a child to a vehicle seat. Further, the CRS may include reinforced mesh, foam, and/or padding that spans a distance between the straps and/or belts of the framework to enhance the support and restraint of a child secured in the harness.

One implementation of the harness utilizes five-points of contact (e.g. left shoulder, right shoulder, left waist or hip, right waist or hip, and groin) to secure the child in either a forward-facing or rear-facing configuration. Another implementation of the harness utilizes two or three of the five-points of contact to secure the child. The CRS may include a secondary fabric harness or swaddle vest designed to adapt the CRS to restrain a smaller child. The swaddle vest may be configured to encompass a portion of the child's body and, when not attached to the CRS, the swaddle vest may be equipped with adjustable shoulder straps that a care provider can use to transport the child to and from the vehicle.

Another implementation of the CRS incorporates a padded back support configured to provide an additional comfort level and help the child to maintain a desired position. Further, a forward-facing implementation of the CRS may incorporate a booster seat formed from an upholstered, foam cushion. The booster seat can adapt the forward-facing CRS to properly fit a smaller child by increasing a height of the smaller child relative to the CRS. The booster seat can be used in conjunction with the CRS until the child is large enough to utilize the CRS safely and comfortably without the booster seat. As a result, the CRS is suitable for use with children of all ages, including infants and toddlers.

A CRS may also incorporate a headrest anchor. The headrest anchor can be secured between a top of a vehicle seat and a corresponding seat headrest. The head rest posts extend through holes in the headrest anchor and into head rest apertures. Alternatively, the headrest anchor may be strapped to the vehicle's front seat or headrest. The CRS restraint hardware, adjusters, hooks, buckles, harness clips, rings, strapping, belting, and any other components used in the fabrication, assembly, and/or use of the CRS may meet various domestic and international safety standards for CRSs used in vehicles.

Figure 1A:
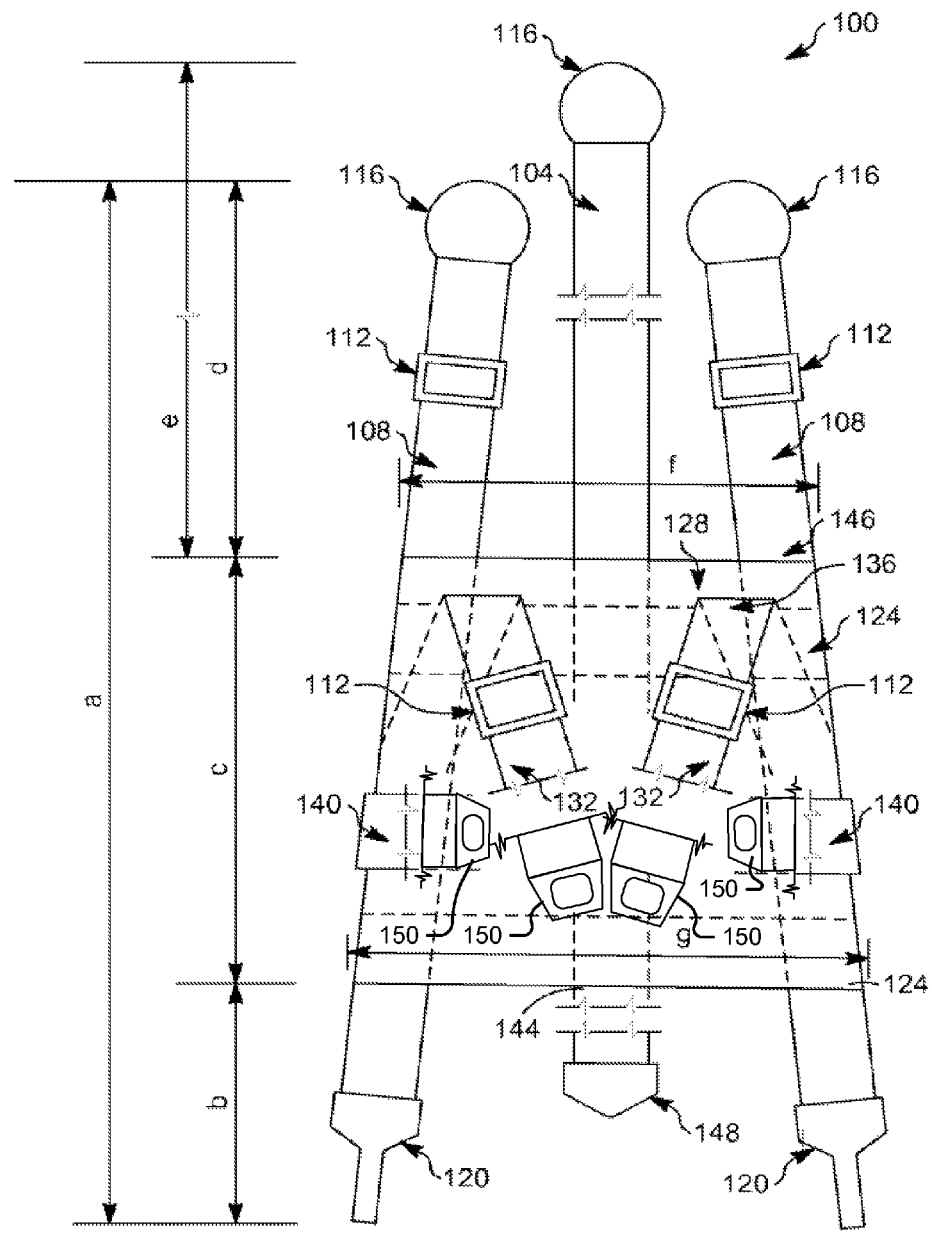
FIG. 1A is a front view of an example CRS incorporating an auxiliary strap in a front-facing configuration.

FIG. 1A is a front view of an example CRS 100 with an auxiliary strap 104 in a front-facing configuration. The CRS 100 includes at least two longitudinal straps 108 configured to attach the CRS 100 to a vehicle seat. The longitudinal straps 108 run generally vertically, but may gradually come closer together at one end of the CRS 100 depending upon the location of the attachment points on the vehicle seat. The CRS 100 depicted in FIG. 1A also includes an optional auxiliary strap 104 to further attach the CRS 100 to the vehicle seat. Depending upon the number and configuration of the attachment points on or near the vehicle seat, auxiliary straps 104 may be used.

Further, the lengths of the auxiliary strap 104 and longitudinal straps 108 can be varied through the use of adjustors 112. Rings 116, hooks 120, clips, and/or other attachment devices are utilized at the ends of the auxiliary strap 104 and longitudinal straps 108 to attach the CRS 100 to attachment points on the vehicle, hereinafter latches. While, two lateral support straps 124 are shown connecting the auxiliary strap 104 and longitudinal straps 108 together, additional lateral support straps 124 may be used. In combination, the auxiliary strap 104, longitudinal straps 108, and lateral support straps 124 form a framework 146 to which a back support 128 may be attached.

The back support 128 may include padding (e.g., foam, batting, and gel), covering (e.g., vinyl-coated polyester, nylon mesh, cotton fabric, and rubber), and/or reinforcement (e.g. vertical and/or horizontal ribbing, paperboard, and reinforced fabric). In the implementation of FIG. 1A, the back support 128 extends horizontally across the entire width of the CRS 100 and vertically from the top horizontal support strap 124 to the bottom horizontal support strap 124. Alternate implementations of the CRS 100 include various number and arrangements of the longitudinal straps 108, lateral support straps 124, and auxiliary strap 104. Further, in alternative implementations the back support 128 spans only a portion of the framework 146.

The CRS 100 of FIG. 1A also includes a harness 132 attached to framework 146 for securing a child in the CRS 100. The harness 132 shown in FIG. 1A is a five-point harness, however, other implementations of a harness 132 attached to the framework 146 are contemplated (e.g., three point and two point harnesses). The five-point harness 132 of FIG. 1A has two shoulder straps 136, a hip strap 140, and a groin strap 144. The hip strap 140 extends from the framework 146 behind the child's hips and the two ends of the hip strap 140 are configured to wrap around the child's hips and come together in front and at the center of the child's waist or groin. The shoulder straps 136 extend from the framework 146 behind the child's shoulder blades and are configured to wrap over the top of the child's shoulders and come together in the same location as the ends of the hip strap 140. The groin strap 144 extends from the framework 146 behind the child's buttocks, between the child's legs, and in front of the child's pelvic region ending at the same location as the ends of the hip strap 140 and the shoulder straps 136. A buckle 148, or other engagement structure, is attached to the end of the groin strap 144 and is configured to selectively attach to clasps 150 at the ends of the hip strap 140, and shoulder straps 136 in front and at the center of the child's waist or groin. The size of the five-point harness 132 may be adjustable depending upon the size of the framework 146 and the child contained within the five-point harness 132.

The CRS 100 of FIG. 1A may have example dimensions as follows. In various implementations, the overall length (a) of CRS 100 is approximately 22 inches. Further, the distance (e) the longitudinal straps 108 extend above the back support 128 is approximately 12 inches and the distance (b) the longitudinal straps 108 extend below the back support 128 is approximately 5 inches. The distance (d) the auxiliary strap 104 extends above the back support 128 is approximately 8 inches. The dimensions of the longitudinal straps 108 and/or auxiliary strap 104 may vary considerably due to the adjustor 112 varying the length of the longitudinal straps 108 and/or auxiliary strap 104. The height (c) of back support 128 is approximately 9 inches while the width of the back support 128 may narrow along with the longitudinal straps 108. The width at the bottom (g) of the back support 128 is approximately 10 inches while the width at the top (f) is approximately 8 inches. These example dimensions are for purposes of illustration only and other dimensions may also be used without departing from the spirit and scope of the CRS 100 disclosed herein.

Figure 1B:
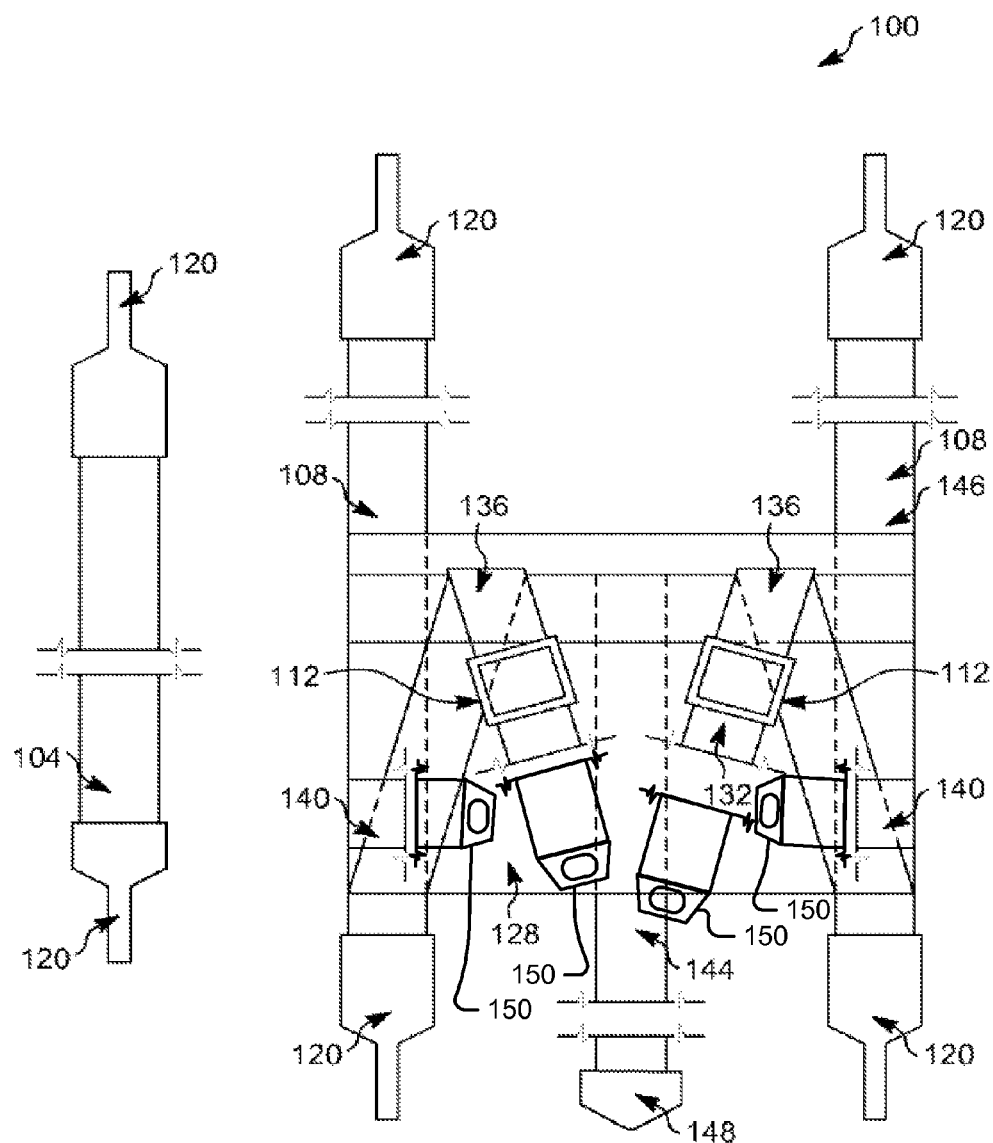
FIG. 1B is a front view of an example CRS with a detachable auxiliary strap in a front-facing configuration.

FIG. 1B illustrates an alternate implementation of a CRS 100 in a front-facing configuration with a detachable auxiliary strap 104. Similar to the CRS 100 shown in FIG. 1A, the CRS 100 in FIG. 1B is equipped with a framework 146, a back support 128, and a five-point harness 132. Dissimilar to the CRS 100 in FIG. 1A, the longitudinal straps 108 of the framework 146 in FIG. 1B run completely vertically and do not come closer together at one end of the CRS 100. Further, the CRS 100 depicted in FIG. 1B utilizes hooks 120 or clips rather than rings 116 at both ends of the two longitudinal straps 108.

The detachable auxiliary strap 104 in FIG. 1B may be equipped with hooks 120, clips, and/or other attachment devices at the ends and an adjustor 112 integrated into the body of the auxiliary strap 104 to vary its length. The auxiliary strap 104 may be attached in a variety of locations on the CRS 100 depending upon the location of the corresponding latches in the vehicle.

Figure 1C:
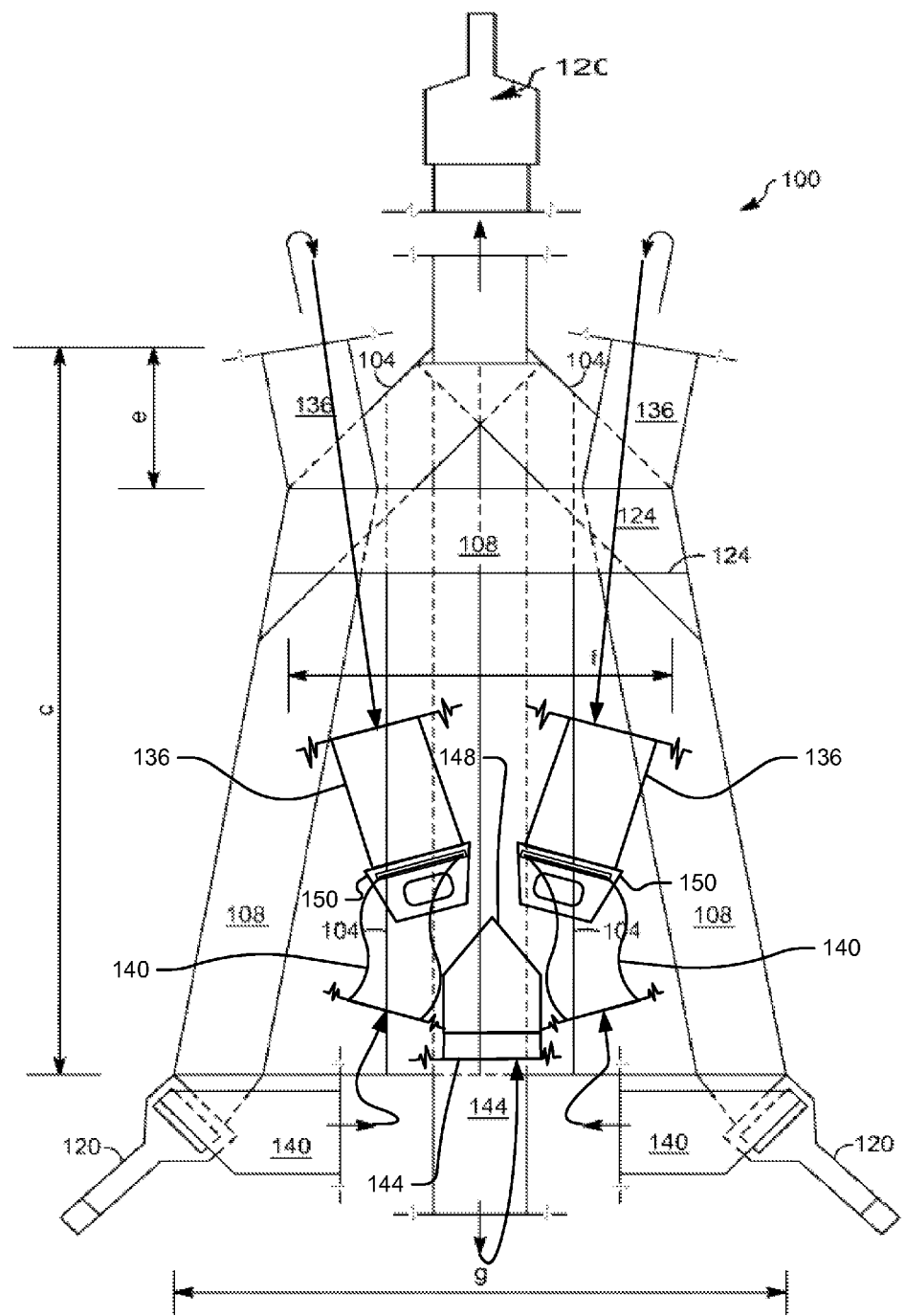
FIG. 1C is a front view of an example CRS with an integrated harness in a front-facing configuration.

FIG. 1C is a front view of an example CRS 100 with an integrated harness in a front-facing configuration. Similar to the CRS 100 shown in FIGS. 1A and 1B, the CRS 100 in FIG. 1C is equipped with a five-point harness as described with respect to FIG. 1A including longitudinal straps 108 that form shoulder straps 136 and hip straps 140 with clasps 150 thereon, and a groin strap 144 with a buckle 140 to which the clasps 150 attach. In the implementation of FIG. 1C, the shoulder straps 136, hip strap 140, and groin strap 144 are integral portions or sections of the longitudinal straps 108 rather than merely being attached to a framework which includes longitudinal straps 108. Thus, in the configuration of FIG. 1C, the harness is integrated into the framework to form the CRS 100 rather than being merely attached to the framework to form the CRS 100.

More specifically, the CRS 100 includes at least three longitudinal straps 108 configured to attach the CRS 100 to a vehicle seat and restrain a child. The longitudinal straps 108 run generally vertically, but may gradually come closer together at one end of the CRS 100 depending upon the location of latches on the vehicle. The outer two longitudinal straps 108 extend along a length of the CRS 100 behind a restrained child's back and wrap around a lateral support strap 124 located near the top of the CRS 100.

Once each longitudinal strap 108 wraps around the lateral support strap 124, the longitudinal straps 108 either become shoulder straps 136 or shoulder straps 136 are attached to the ends of each longitudinal strap 108. While not shown in FIG. 1C, the shoulder straps 136 wrap over and around the child's shoulders and are attached to a buckle located near the child's groin (see FIG. 2E).

Also not shown in FIG. 1C, hip straps 140 extend out of the buckle located near the child's groin toward hooks 120 configured to secure the CRS 100 to a vehicle latches. In one implementation, the hip straps 140 are connected to the buckle separately from the shoulder straps 136. In another implementation, the hip straps 140 are attached to the ends of each shoulder strap 136. In yet another implementation, the hip straps extend seamlessly from each shoulder strap 136 (see FIG. 2F).

In the implementation shown in FIG. 1C, the hip straps 140 extend through slots in hooks 120 and then continue seamlessly as longitudinal straps 108. In other implementations, the hip straps 140 are connected to the hooks 120 separately from the longitudinal straps 108. In a still further implementation, the hip straps 140 are attached to the ends of each longitudinal strap 108. Therefore, in some implementations, the combination of each outer longitudinal strap 108, shoulder strap 136, and groin strap 140 forms a continuous loop of strapping (see FIG. 2E).

Further, the middle longitudinal strap 108 attaches to a vehicle latch via a ring 116, hook 120, clip, and/or other attachment device. The middle longitudinal strap 108 then extends along the length of the CRS 100 behind the child's back. As the middle longitudinal strap 108 emerges from a bottom of the CRS 100, the middle longitudinal strap 108 becomes groin strap 144 that extends between the child's legs and in front of the child's groin. While not shown in FIG. 1C, the groin strap may end with a buckle adapted to attach the shoulder straps 136, hip straps 140, and the groin strap 144 together in front of the child's groin.

The CRS 100 depicted in FIG. 1C also includes optional auxiliary straps 104 to further strengthen the CRS 100. Two auxiliary straps 104 immediately adjacent one another are shown running longitudinally on top of the middle longitudinal strap 108 in FIG. 1C. Further, two additional auxiliary straps 104 are shown oriented at an angle connecting the outer longitudinal straps 108 to the middle longitudinal strap 108. The auxiliary straps 104 reinforce the strength of the CRS 100. In other implementations, a greater or fewer quantity of auxiliary straps 104 may be used in various configurations to strengthen the CRS 100.

Further, length of the longitudinal straps 108, lateral support strap 124, shoulder straps 136, hip straps 140, and/or groin strap 144 can be varied through the use of adjustors (not shown). Rings, hooks, clips, and/or other attachment devices are utilized at the ends of the longitudinal straps 108 to attach the CRS 100 to the vehicle latches.

In combination, the auxiliary straps 104, longitudinal straps 108, and lateral support strap 124 form a framework to which a back support (not shown) as described above in FIG. 1A may be attached. In the implementation of FIG. 1C, the back support extends horizontally across the entire width of the CRS 100 and vertically from the top horizontal support strap 124 to the bottom of the CRS 100. Alternate implementations of the CRS 100 include various number and arrangements of the longitudinal straps 108, lateral support straps 124, and auxiliary straps 104. Further, in alternative implementations the back support 128 spans only a portion of the framework.

The CRS 100 of FIG. 1C may have example dimensions as follows. In various implementations, the height (c) of back support is approximately 14 inches and the distance (e) the back support extends above the lateral support strap 124 is approximately 2 inches. The width at the top (f) of the back support is approximately 7 inches while the width may progressively widen toward the bottom of the CRS 100. The width at the bottom (g) of the back support is approximately 10 inches. These example dimensions are for purposes of illustration only and other dimensions may also be used without departing from the spirit and scope of the CRS 100 disclosed herein.

Figure 2A:
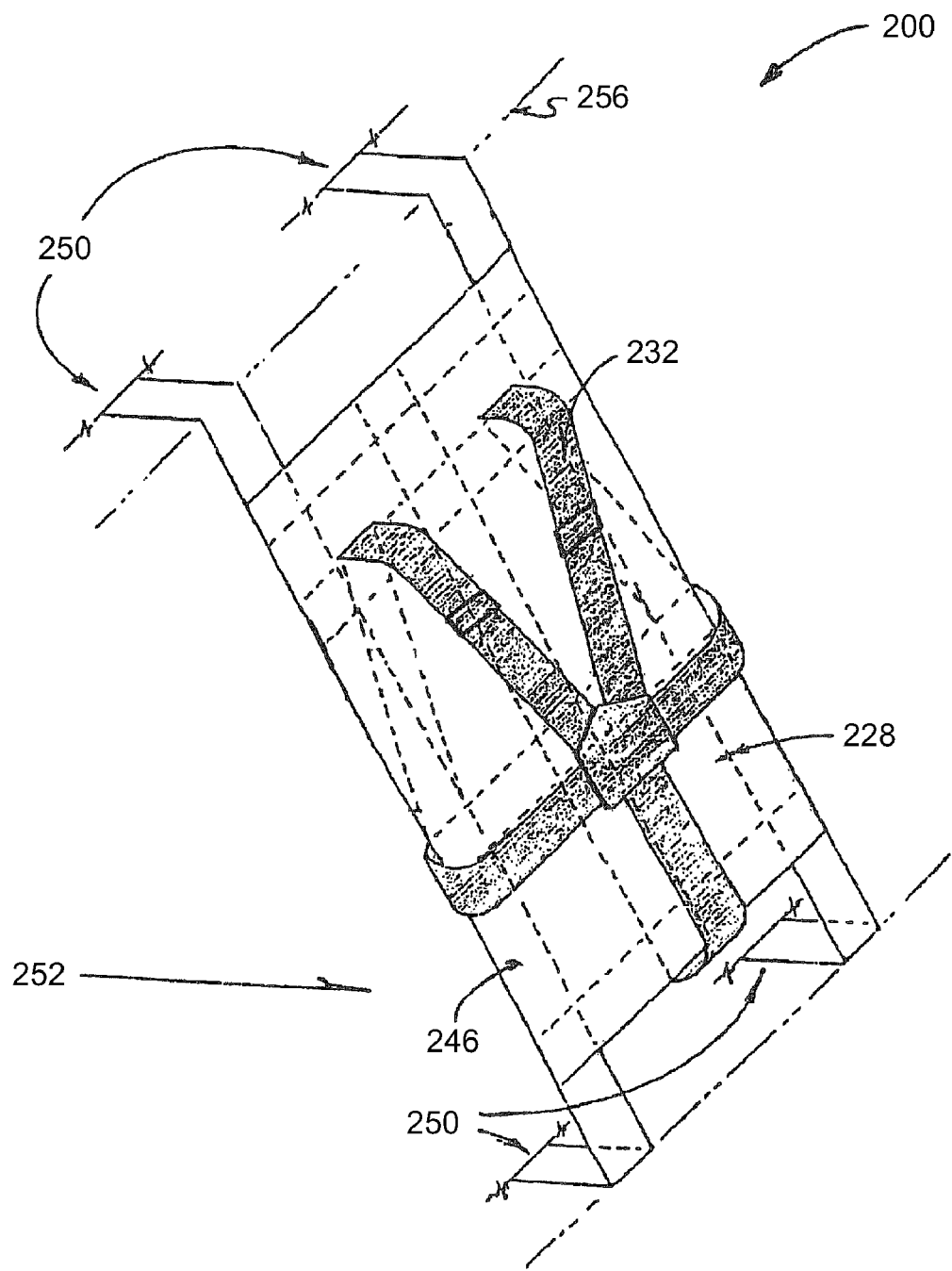
FIG. 2A is an isometric view of an example CRS attached to a seatback of a vehicle.

FIG. 2A is an isometric view of an example CRS 100 attached to a seatback 252 of a vehicle. Similar to the CRS 100 depicted in FIGS. 1A-1C, the CRS 200 of FIG. 2A includes a framework 246, a back support 228, and a five-point harness 232. Further, the CRS 200 is configured to rest against the vehicle seatback 252 and free ends of the framework 246 are configured to selectively attach to latches 250 fixed to the vehicle, thereby securing the CRS 200 to the vehicle seatback 252. The latches 250 may be located anywhere in the vehicle accessible from the seatback 252 (e.g., top of the seatback 252, vehicle floorboard, vehicle roof, and seat frame).

Figure 2B:
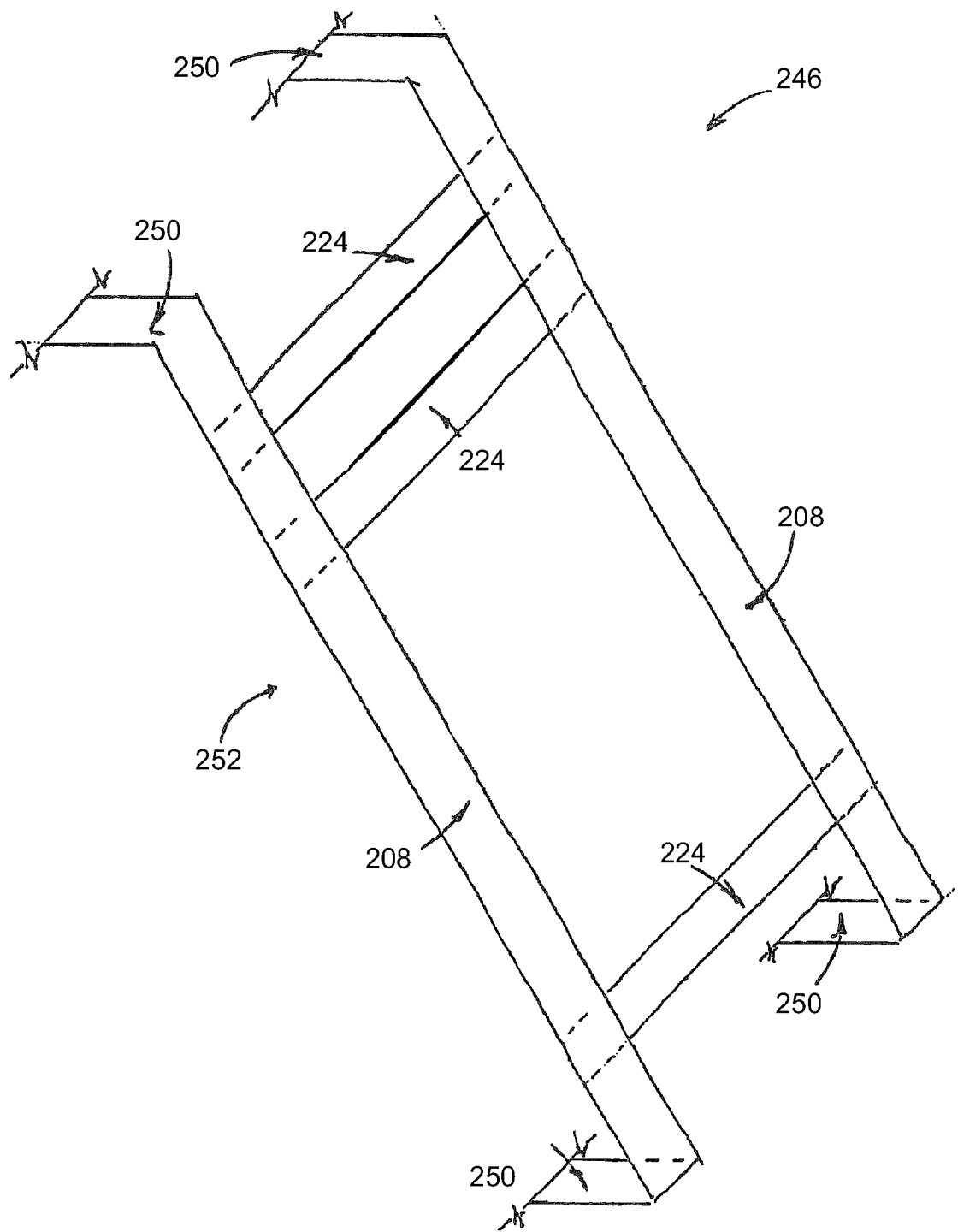
FIG. 2B is an isometric view of an example framework attached to a seatback of a vehicle.

FIG. 2B is an isometric view of an example framework 246 attached to a seatback 252 of a vehicle. As discussed above with respect to FIGS. 1A-1C, the framework 246 includes at least two longitudinal straps 208 and one or more lateral support straps 224. The degree of adjustability of an associated five-point harness is dependant upon the number and location of the longitudinal support straps 208 and the lateral support straps 224. In the implementation depicted in FIG. 2B, there are three lateral support straps 224. The ends of the longitudinal straps 208 have attachment devices (e.g., rings, hooks, and clips) that are configured to selectively attach to latches 250 fixed to the vehicle.

Figure 2C:
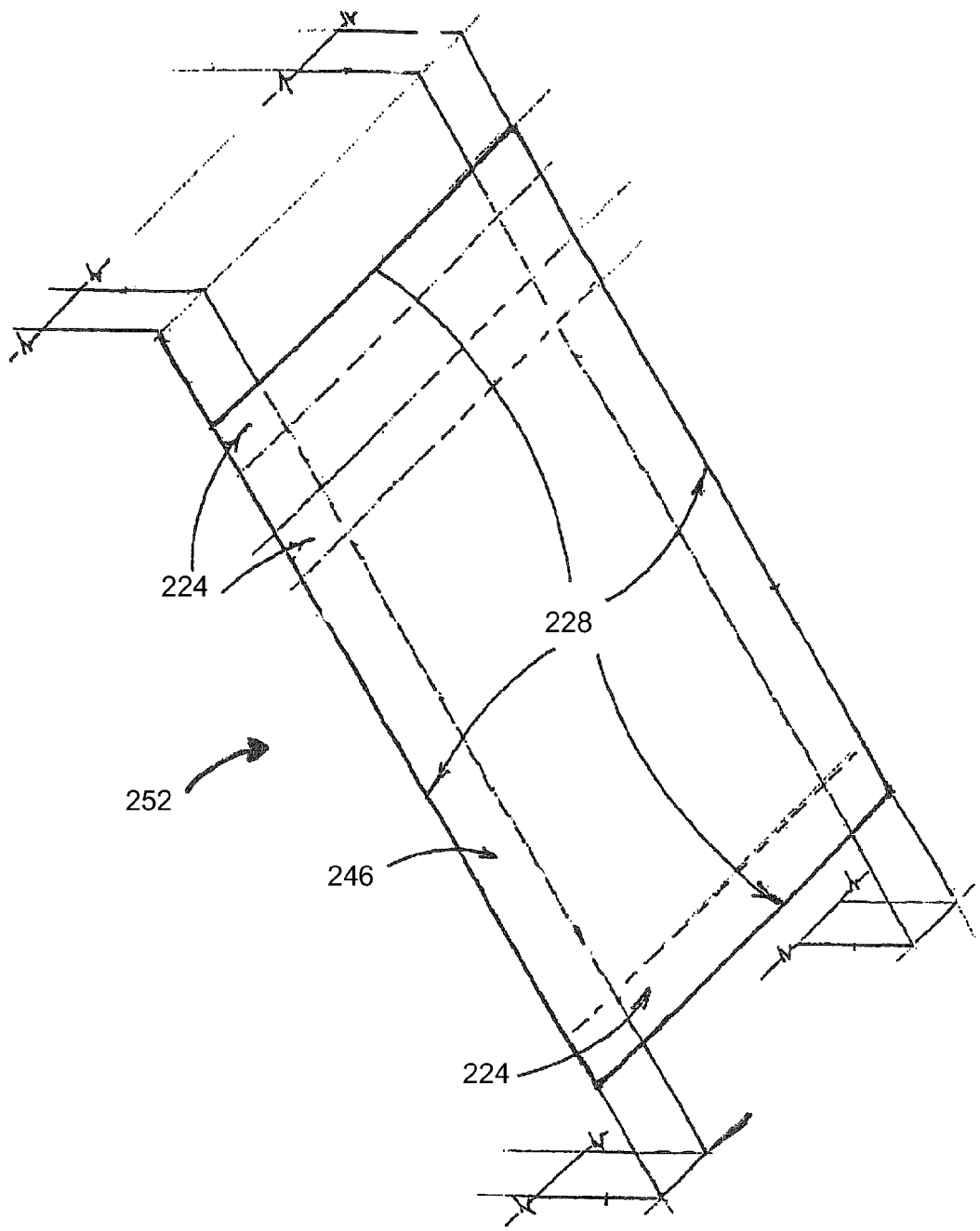
FIG. 2C is an isometric view of an example framework and back support attached to a seatback of a vehicle.

FIG. 2C is an isometric view of an example framework 246 and back support 228 attached to a seatback 252 of a vehicle. As discussed above with respect to FIG. 1A, the back support 228 may be attached to the framework 246 and extends horizontally across the entire width of the CRS 100 and vertically from the top horizontal support strap 224 to the bottom horizontal support strap 224 in some implementations.

Figure 2D:
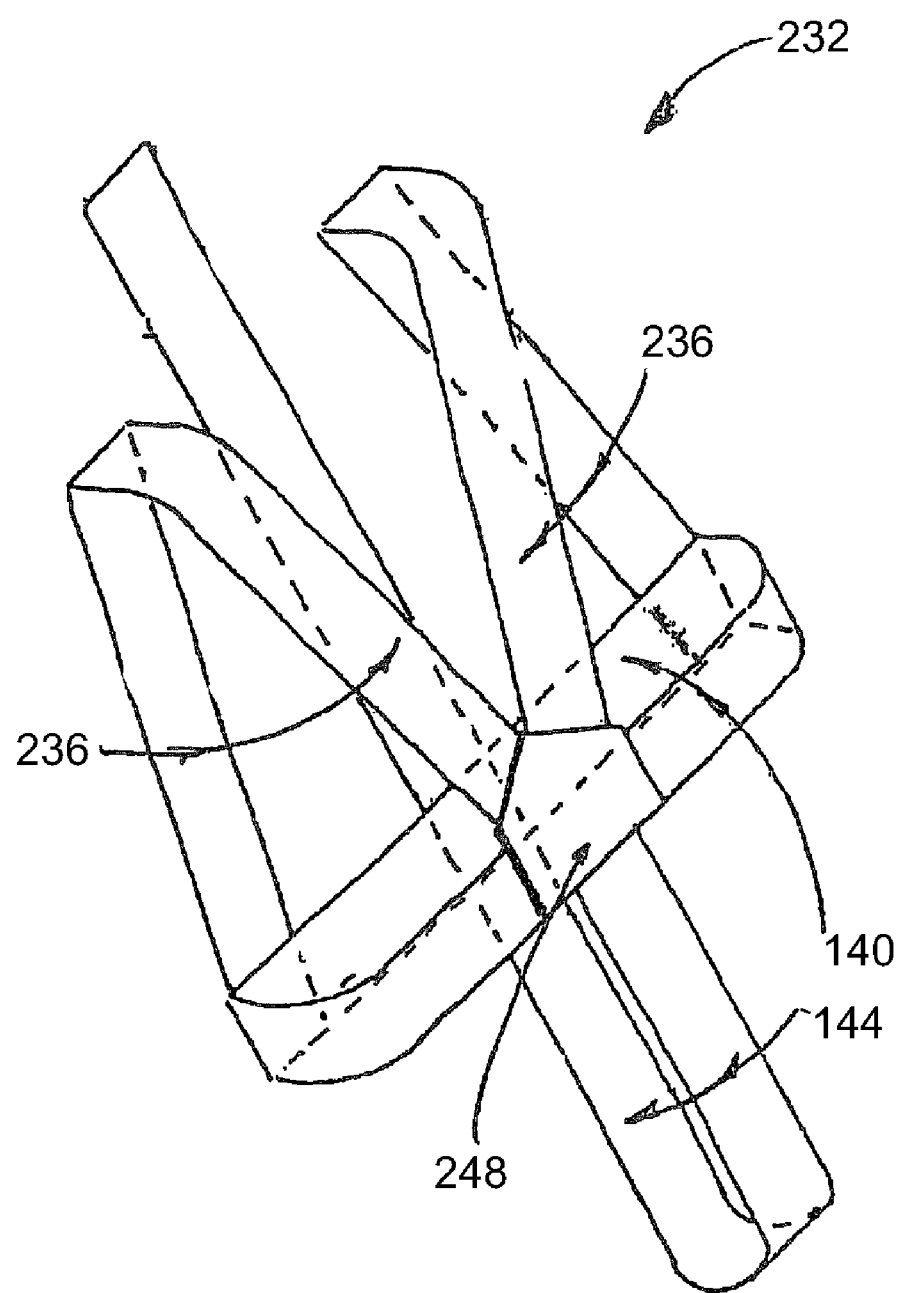
FIG. 2D is an isometric view of an example five-point harness to be used in conjunction with a framework to make up a CRS.

FIG. 2D is an isometric view of an example five-point harness 232 to be used in conjunction with a framework to make up a CRS. As discussed above, the five-point harness 232 includes two shoulder straps 236, a hip strap 240, and a groin strap 244 that are affixed together except in front and at the center of the child's waist or groin, where they meet and are selectively attached together with a buckle 248.

Figure 2E:
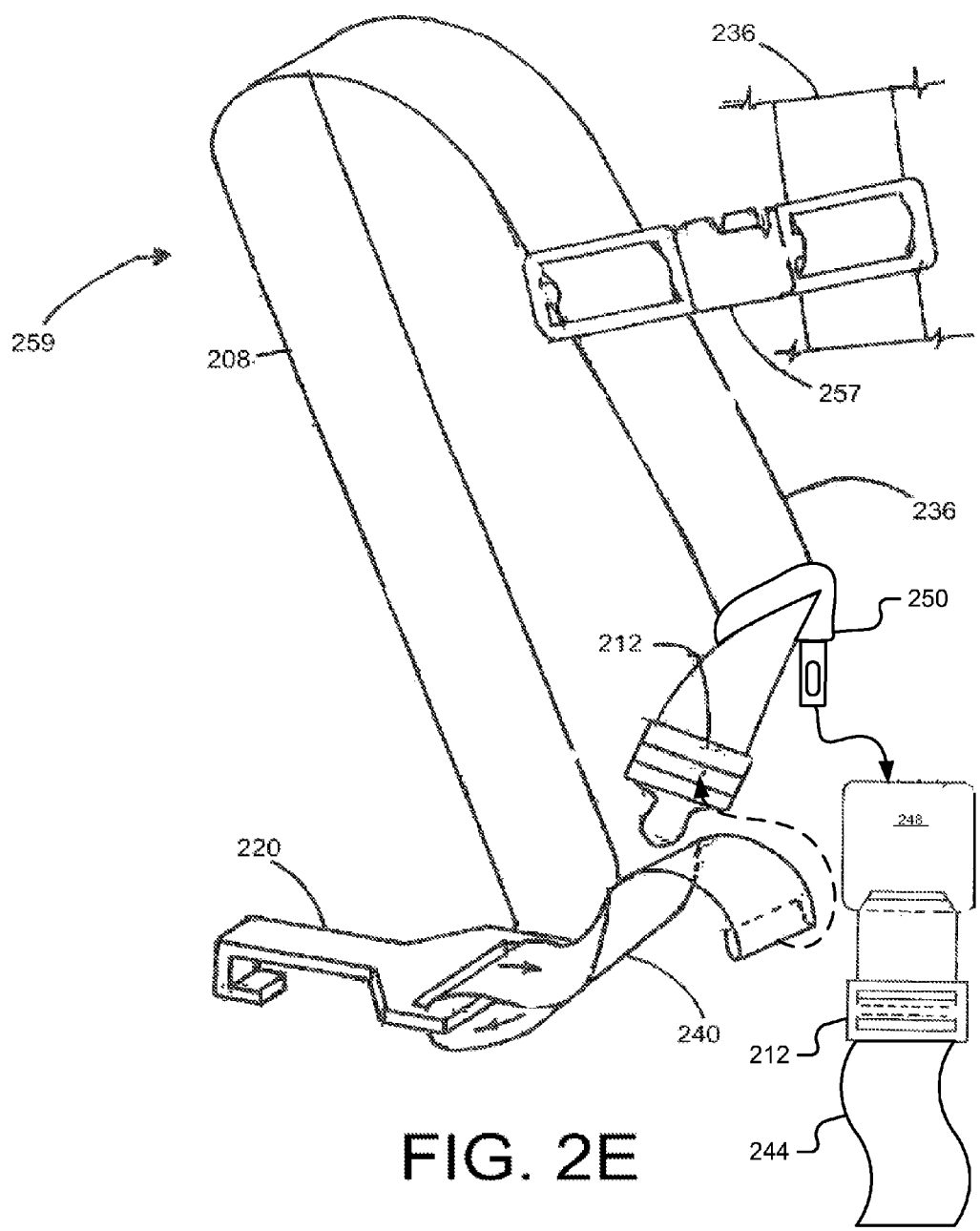
FIG. 2E is an isometric view of an example longitudinal strap, shoulder strap and hip strap configured as one continuous strap to be used with a CRS.

FIG. 2E is an isometric view of an example longitudinal strap 208, shoulder strap 236 and hip strap 240 configured as one continuous strap 259 to be used with a CRS. Similar to the implementation shown in FIG. 1C, the straps shown in FIG. 2E are configured as a continuous strap 259, however, other implementations may have separate longitudinal straps 208, shoulder straps 236, and/or hip straps 240 attached to the ends of one another to form the strap shown in FIG. 2E.

One end of the shoulder strap 236 begins with an adjustor 212 that is adapted to receive an opposite free end of the continuous strap 259 and adjust the size of a loop formed by the continuous strap 259 fed into the adjustor 212. The shoulder strap 236 proceeds upward along a restrained child's abdomen and chest and wraps over the child's shoulders. Then the shoulder strap 236 becomes the longitudinal strap 208 and extends behind the child's back downward toward the bottom of the CRS. As the longitudinal strap 208 extends from the bottom of the CRS, it is fed through a hook 220 that is adapted to attach the CRS to a vehicle latch. When the longitudinal strap emerges from the hook 220, it becomes the hip strap 240 that then wraps around the front of the child's hips and the free end is adapted to be fed into the adjustor 212 so that the size of the loop formed by the continuous strap 259 may be adjusted for the child's size and orientation of an associated vehicle latch.

Figure 2F:
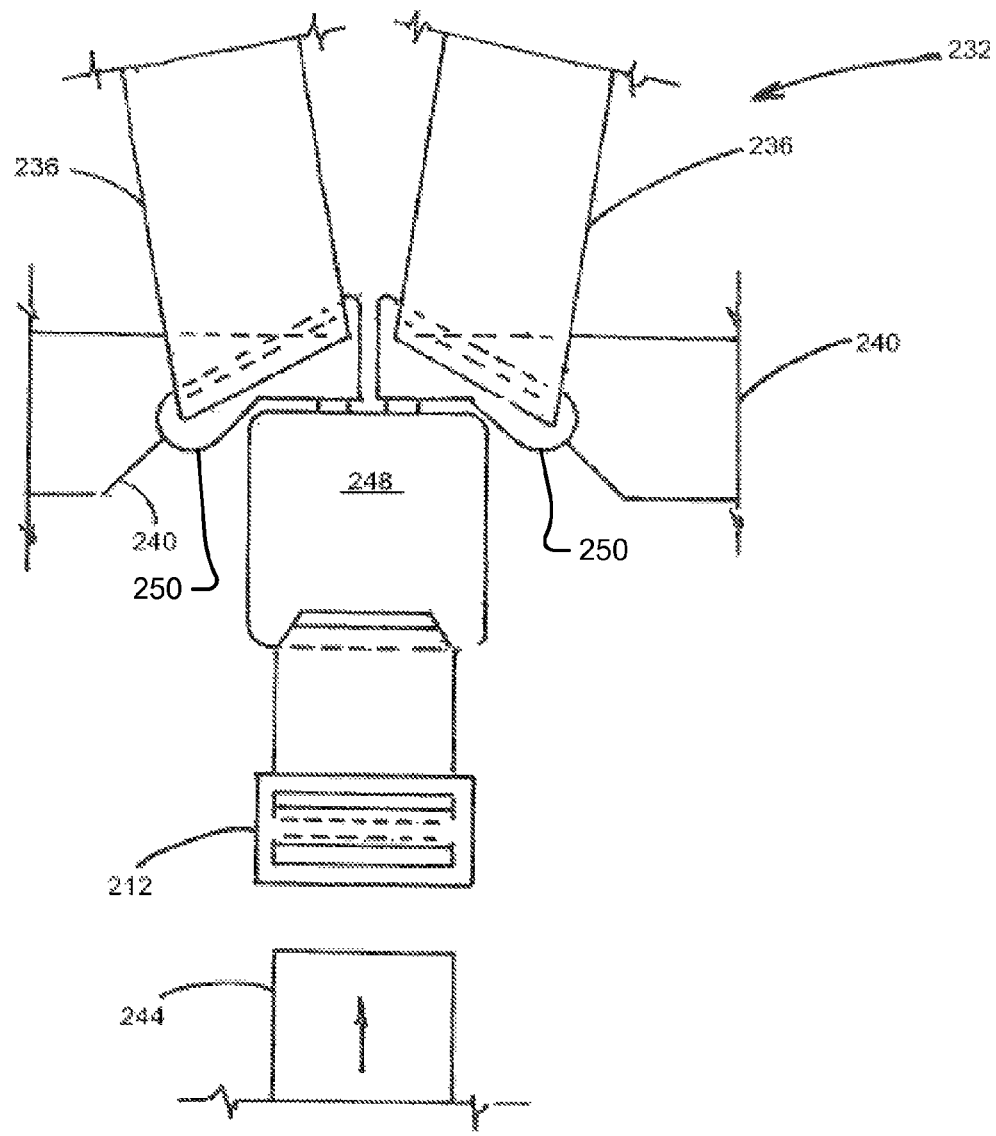
FIG. 2F is a partial front view of an example five-point harness to be used with a CRS.

As shown in FIG. 2E, a male portion of a buckle 250 is located on the continuous strap 259 between the hip strap 240 and shoulder strap 236 and the male portion of the buckle 250 is adapted to attach to a female portion of the buckle 248 attached to a groin strap (see e.g., FIG. 2F). In some implementations, the male portion of the buckle 250 is fixed to one location on the continuous strap 259. In other implementations, the male portion of the buckle 250 is slideably attached to the continuous strap 259 and may be moved to a desired location on the continuous strap 259. Further, the adjustor 212 may be located in various positions on the continuous strap 259 as desired. Finally, an optional chest buckle 257 is adapted to selectively secure the shoulder strap 236 to another shoulder strap 236 across the child's chest.

FIG. 2F is a partial front view of an example five-point harness 232 to be used with a CRS. In this implementation, shoulder straps 236 extending over a restrained child's shoulders and chest continue through separate male portions of a buckle 250 and emerge from the male portions the buckle 250 as hip straps 240 that wrap around the child's hips or waist. Groin strap 244 extends between the child's legs in front of his/her groin and ends with a female portion of the buckle 248. The male portions of the buckle 250 are adapted to selectively attach to the female portion of the buckle 248. Further, adjustors 212 located on the shoulder straps 236, hip straps 240, and/or groin strap 244 are adapted to adjust the length of the shoulder straps 236, hip straps 240, and/or groin strap 244 to securely fit the restrained child.

FIG. 3A is an elevation view of an example front-facing CRS 300 incorporating a booster seat 364 positioned on top of a vehicle seat. The CRS 300 is equipped with an optional booster 364, mounted on top of a seat bottom 358 and adjacent to a seatback 352, to elevate a smaller child to a height appropriate for safe use of the CRS 300. A front seatback 360 is shown to illustrate the position of the CRS 300 when installed on a rear vehicle seat.

Figure 3B:
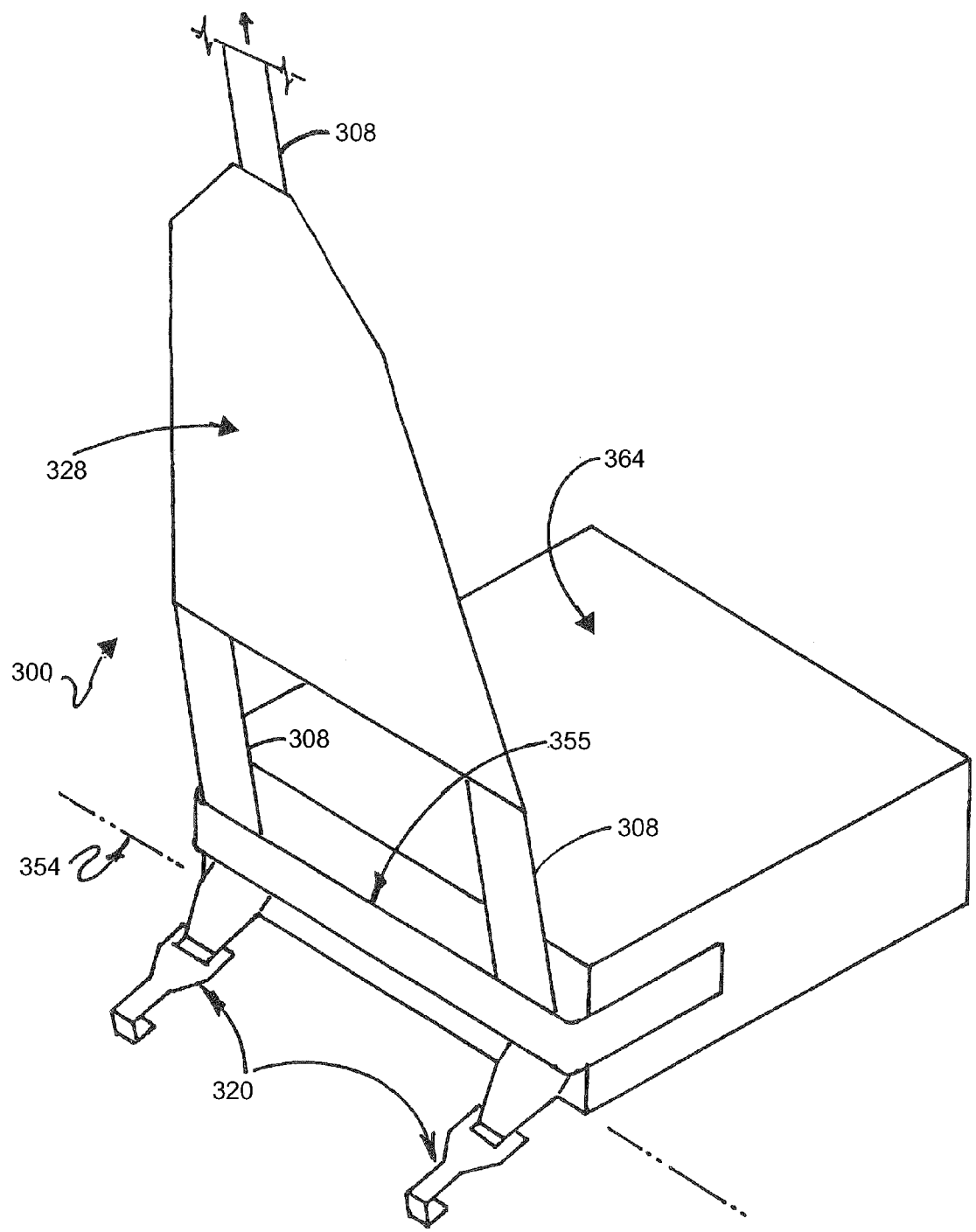
FIG. 3B is an isometric view of an example booster seat to be used in conjunction with a front-facing CRS.

FIG. 3B is an isometric view of an example booster seat 364 to be used in conjunction with a front-facing CRS 300. The booster seat 362 is positioned on top of a seat bottom and in some implementations is equipped with a positioning strap 355 that is attached to the sides of the booster seat 362 and wraps around the rear of the booster seat 362. Longitudinal straps 308 extend from hooks 320 that are attached to latches on the vehicle (not shown in FIG. 3) through a seat crevasse 354 between a seatback and the seat bottom. The longitudinal straps 308 further extend between the positioning strap 355 and a rear of the booster seat 362 and are attached to a framework of the CRS 300. Further, the CRS 300 is secured by extending a longitudinal strap 308 from the top of the framework to another vehicle latch.

The positioning strap 355 prevents the booster seat 364 from substantial lateral movement thus ensuring that the booster seat 364 remains in front of the CRS 300 during use. Further, the positioning strap 355 may allow the booster seat 364 to slide vertically so that the booster seat 364 remains positioned directly adjacent a top of the seat bottom while the CRS 300 is adjusted vertically through the use of one or more adjustors.

Figure 4A:
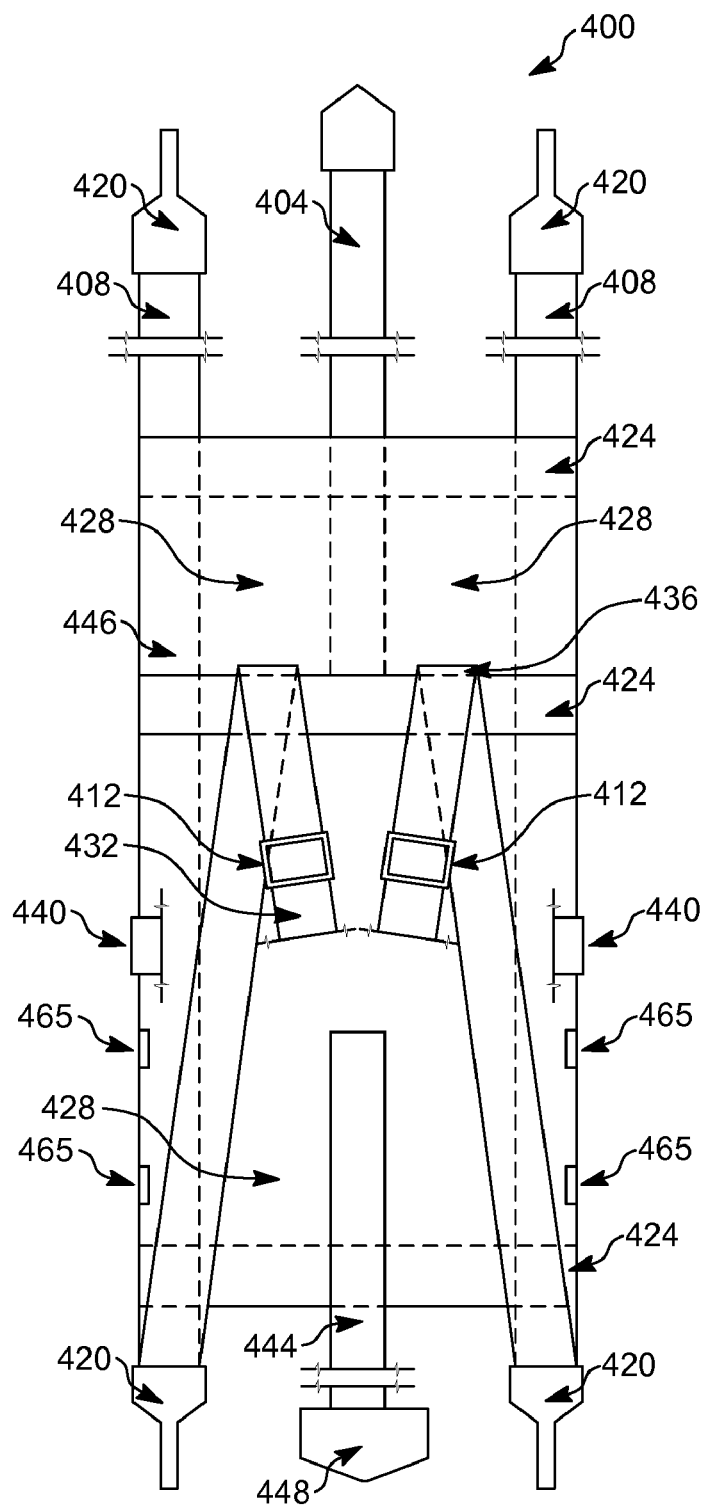
FIG. 4A is a top view of an example CRS incorporating an auxiliary strap in a rear-facing configuration.

FIG. 4A is a top view of an example CRS 400 incorporating an auxiliary strap 404 in a rear-facing configuration. The CRS 400 includes two longitudinal straps 408 with attachment devices configured to attach the CRS 400 to vehicle latches. The longitudinal straps 408 run generally parallel from one end of the CRS 400 to the other end of the CRS 400. The CRS 400 also includes an optional auxiliary strap 404 to further attach the CRS 400 to the latches. Anchor points 465 are also utilized to attach the CRS 400 to the latches. Depending upon the number and configuration of the latches, or other attachment points on the vehicle, one or more auxiliary straps 404 may be used. Further, hooks 420 and/or other attachment devices are utilized at the ends of the auxiliary strap 404 and longitudinal straps 408 to attach the CRS 400 to the latches. Lateral support straps 424 connect the auxiliary strap 404 and longitudinal straps 408 together.

In combination, the auxiliary strap 404, longitudinal straps 408, and lateral support straps 424 form a framework 446 to which a back support 428 may be attached. The back support 428 may include padding (e.g., foam, batting, and gel), covering (e.g., nylon mesh, cotton fabric, and rubber), and/or reinforcement (e.g. vertical and/or horizontal ribbing, paperboard, and reinforced fabric). In the implementation of FIG. 4A, the back support 428 extends horizontally across the entire width of the CRS 400 and vertically from the top lateral support strap 424 to the bottom lateral support strap 424. In other implementations, the back support 428 spans only a portion of the framework 446.

The CRS 400 also includes a five-point harness 432 made up of shoulder straps 436 with adjustors 412, a hip strap 440, and a groin strap 444 with a buckle 448. The harness 432 is attached to the auxiliary strap 404, longitudinal straps 408, and/or lateral support straps 424 for securing the child in the CRS 400. An example five-point harness 432 is described in detail with respect to FIG. 1A.

Figure 4B:
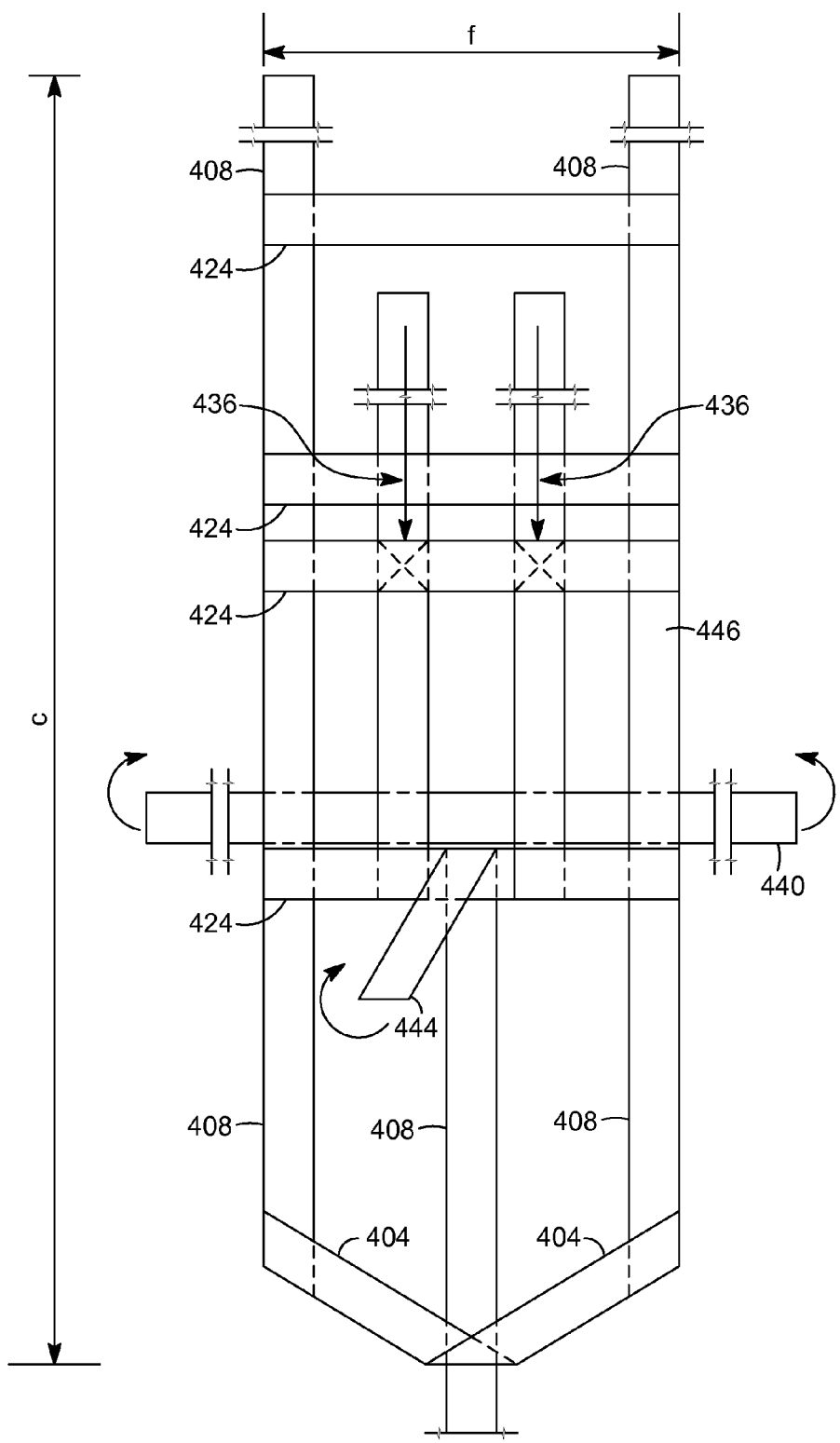
FIG. 4B is a top view of an example CRS without an auxiliary strap in a rear-facing configuration.

FIG. 4B is a top view of an example CRS 400 in a rear-facing configuration. Similar to the implementation of FIG. 4A, the CRS 400 of FIG. 4B, includes a framework 446 made up of longitudinal straps 408, lateral support straps 424, and auxiliary straps 404. A back support may be attached to the framework. Further, the CRS 400 of FIG. 4B includes two outer longitudinal straps 408 adapted to attach to a front vehicle seat, front vehicle seat frame, or to latches near a front vehicle seat. The outer longitudinal straps 408 extend into the framework of the CRS 400 and unlike the implementation of FIG. 4A, the outer longitudinal straps 408 of CRS 400 of FIG. 4B terminate within the framework at one end of auxiliary straps 404. The auxiliary straps 404 carry the load of the outer longitudinal straps 408 to a central longitudinal strap 408 that extends from a lateral support strap 124 out of the framework and is selectively attached to a vehicle latch located on or behind a rear seat back. One or more additional lateral support straps 124 may be utilized to laterally strengthen the CRS 400. In the CRS 400 shown in FIG. 4B, there are four lateral support straps 424.

The CRS 400 of FIG. 4B also includes a five-point harness 432 made up of shoulder straps 436, a hip strap 440, and a groin strap 444. The harness 432 is attached to longitudinal straps 408 and/or lateral support straps 424 for securing a child in the CRS 400. An example five-point harness 432 is described in detail with respect to FIG. 1A.

The CRS 400 of FIG. 4B may have example dimensions as follows. In various implementations, the height (c) of the back support is approximately 34 inches. The width at the top (f) of the back support is approximately 13 inches while the width may progressively widen, narrow, or remain the same toward the bottom of the CRS 400. These example dimensions are for purposes of illustration only and other dimensions may also be used without departing from the spirit and scope of the CRS 400 disclosed herein.

Figure 5A:
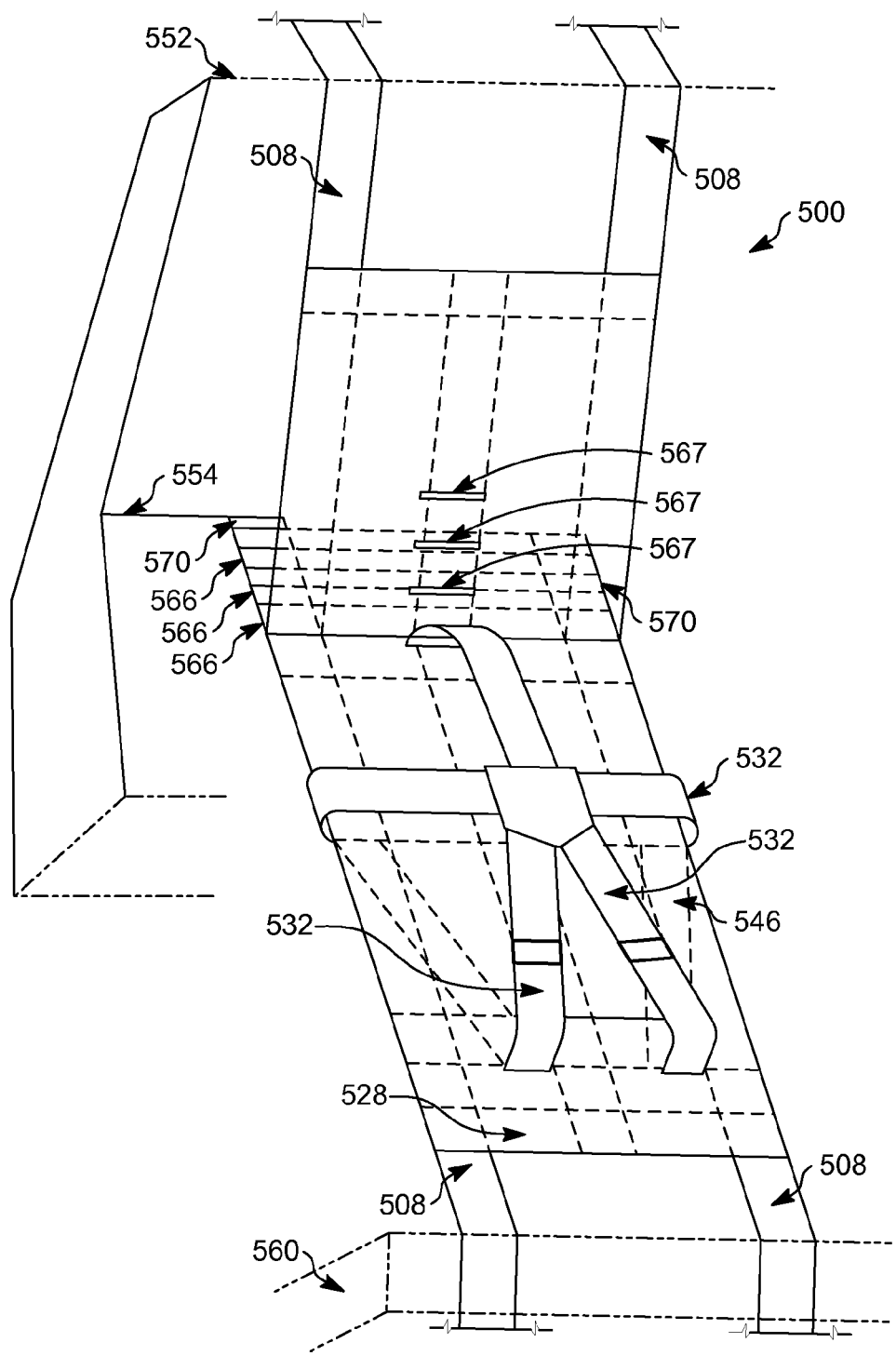
FIG. 5A is an isometric view of a first example rear-facing CRS adapted to attach to front and rear seats of a vehicle.

FIG. 5A is an isometric view of a first example rear-facing CRS 500 adapted to attach to front and rear seats of a vehicle. Similar to the implementation depicted in FIGS. 4A and 4B, the CRS harness 500 in FIG. 5 includes a framework 546, a back support 528, and a five-point harness 532. In a rear facing configuration, the framework 546 utilizes a set of longitudinal straps 508 and a set of crevice straps 570 to attach the CRS 500 to the vehicle. The first ends of the crevice straps 570 are attached to points along the length of the longitudinal straps 508, i.e. anchor points 566. The second set of free ends of the crevice straps 570 are selectively attached to latches or other attachment points in a crevice 554 between a rear seatback 552 and the rear seat bottom of the vehicle. The first set of free ends of the longitudinal straps 508 are selectively attached to latches fixed to the front seatback 560, the front seatback frame, and/or latches installed near the front seatback. The second set of free ends of the longitudinal straps 508 are selectively attached to latches fixed on or behind the rear seat back 556 of the vehicle.

The resulting fully supported five-point harness 532 is positioned so that the child is safely suspended between the front seatback 560 and rear seatback 552 of the vehicle, in a partially reclining position, facing rearward. Additionally, the position of the crevice straps 570 is adjustable by selecting one of a variety of available anchor points 566. Further, the size of the five-point harness 532 is adjustable by selecting one of a variety of available groin strap slots 567. The size selection of the five-point harness 532 and orientation selection of the anchor points 566 depends on the size of the child to be restrained and the size and orientation of the front and rear seats of the vehicle.

Figure 5B:
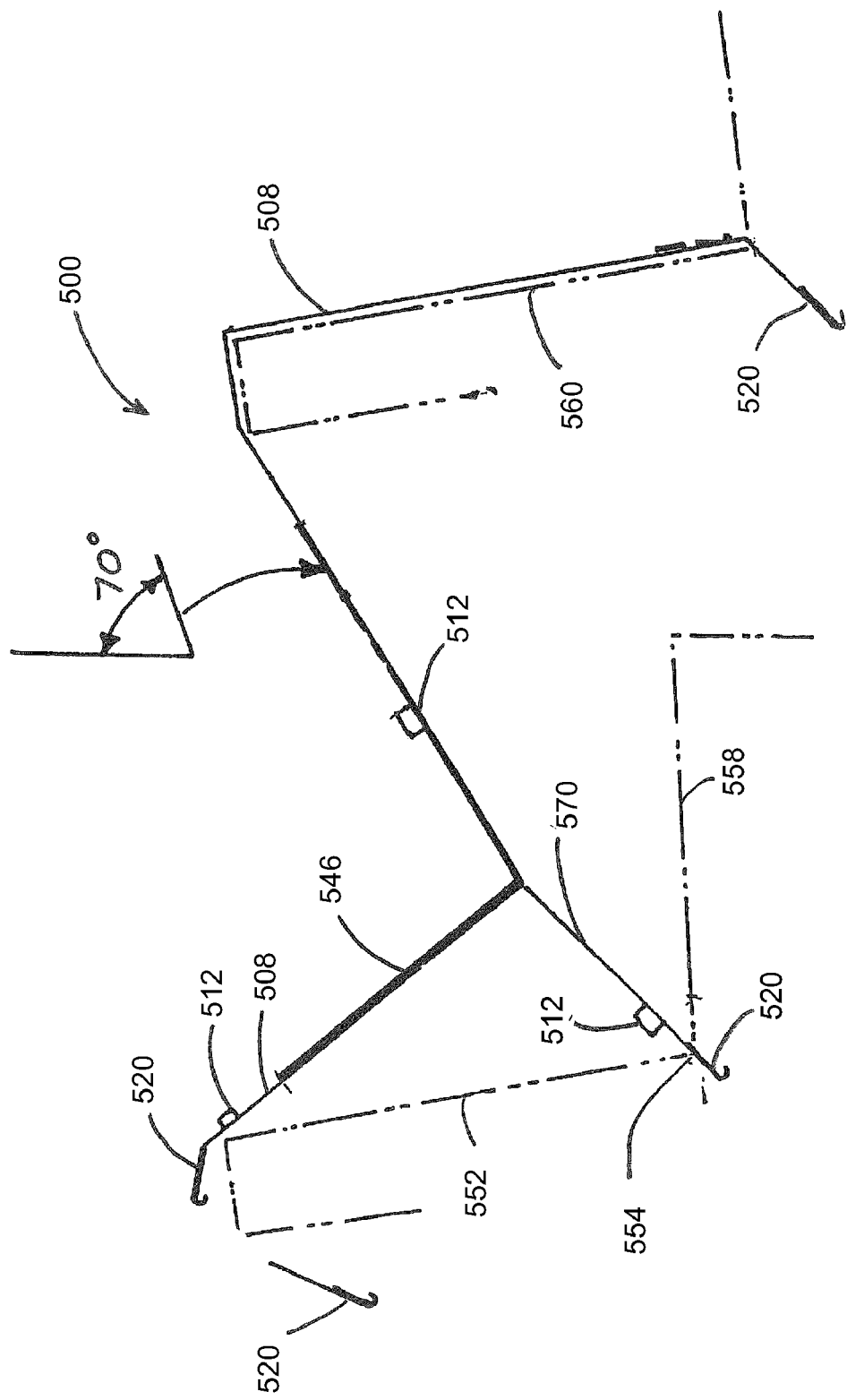
FIG. 5B is an elevation view of a second example rear-facing CRS adapted to attach to front and rear seats of a vehicle.

FIG. 5B is an elevation view of a second example CRS 500 adapted to attach to front and rear seats of a vehicle. A framework 546 of CRS 500 is suspended between a front seat and a rear seat of a vehicle by at least three points of contact with the vehicle; a point of contact near a front seatback 508, a point of contact behind a rear seatback 552, and a point of contact in the crevice between the rear seatback 552 and a rear seat bottom 558.

Longitudinal straps 508 extend between a front seatback 508 and a rear seatback 552. First ends of the longitudinal straps 508 connect to the front seatback, front seat frame, and/or latches near the front seat via hooks 520 to create the first point of contact. In the implementation shown in FIG. 5B, the longitudinal straps 508 wrap over the top and extend down the front of the front seatback 508. The longitudinal straps 508 continue through a crevice between the front seatback 508 and the front seat bottom and end in hooks 520 that may connect to the seat frame or latches in the vehicle floorboard, for example.

Hooks 520 on second ends of the longitudinal straps 508 connect to latches behind the rear seatback 552 to create the second point of contact. The latches behind the rear seatback 552 may be located on the floorboard or ceiling, for example. Crevice straps 570 extend from a middle of the longitudinal straps 508, pulling the longitudinal straps 508 downward toward the rear vehicle seat. The crevice straps 570 are attached to latches located in a crevice between the rear seatback 552 and the rear seat bottom 558 via hooks 520 resulting in the third point of contact.

Adjustors 512 may be located on one or more of the longitudinal straps 508 and/or crevice straps 570 to adjust the size and/or orientation of the framework 512. One criterion may be that the angle of the longitudinal straps 508 where the child's back is located may not exceed 70 degrees of angle with respect to the horizontal.

Figure 5C:
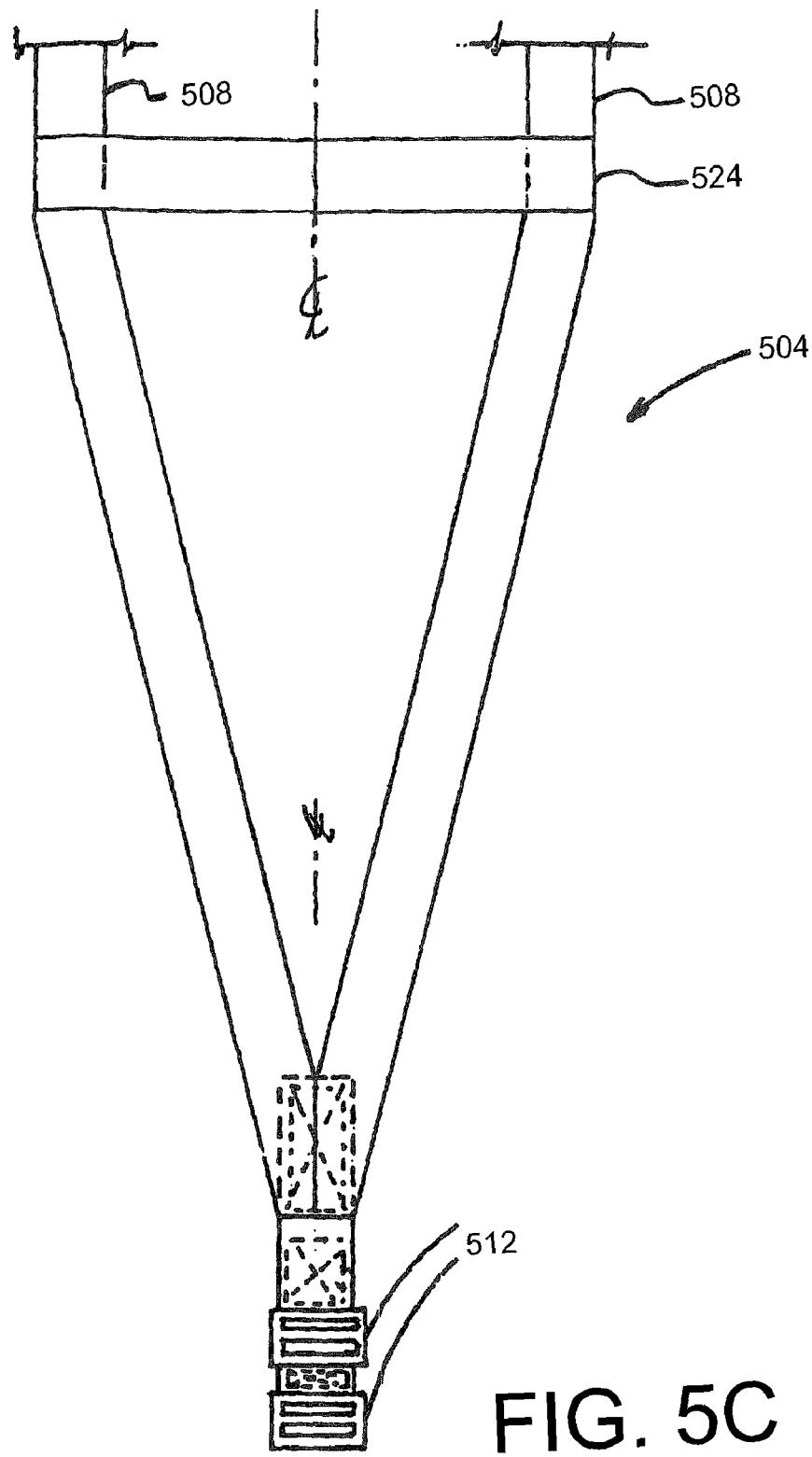
FIG. 5C is a front view of an auxiliary strap for attaching a CRS to a floorboard anchor point on a vehicle.

FIG. 5C is a front view of an auxiliary strap 504 for attaching a CRS to a floorboard anchor point on a vehicle. In one implementation, a CRS harness having two or more longitudinal straps 508 needs to be connected to a single latch located on the vehicle. Here, the auxiliary strap 504 for reducing two longitudinal straps 508 to one attachment point for a vehicle latch is shown. Further, the auxiliary strap 504 may be equipped with one or more adjustors 512 for adjusting the length of the auxiliary strap 504 to fit the vehicle. Also, the auxiliary strap 504 may be used to attach the CRS to a front vehicle seat frame by wrapping around the frame (sometimes referred to as a Swedish connection).

FIG. 6A is a left side elevation view of an example front-facing swaddle vest 600 to be used in conjunction with a CRS. The swaddle vest 600 is a separate harness that is attachable to a framework of the CRS when required for use by a smaller child. The swaddle vest 600 includes a front half 668 and a rear half 672 that in combination encompasses a lower portion of the child's body. The front half 668 and the rear half 672 are merged together at the base of the swaddle vest 600 and are selectively attached together near the middle of the swaddle vest 600 via a buckle 676. The child's legs extend though openings between the front half 668 and the rear half 672. The front half 668 of the swaddle vest 600 may extend upwardly to support the child's chest. Any unwanted upward extension of the swaddle vest 600 may be folded over in front of the child's chest. The swaddle vest 600 is equipped with belt loops 680 around the middle of the swaddle vest 600 and at the top of the swaddle vest 600 and a ring 684 at the base of the swaddle vest 600 to secure the swaddle vest 600 to the framework.

FIG. 6B is a left side elevation view of an example rear-facing swaddle vest 600 to be used in conjunction with a CRS. When utilized in a rear-facing configuration, the child is turned around to face the opposite direction in the swaddle vest 600. Accordingly, the front half 668 of the swaddle vest 600 may be unfolded and extended upwardly to support the child's back, neck, and/or head rather than the child's chest as in the front-facing configuration of FIG. 6A.

Figure 6D:
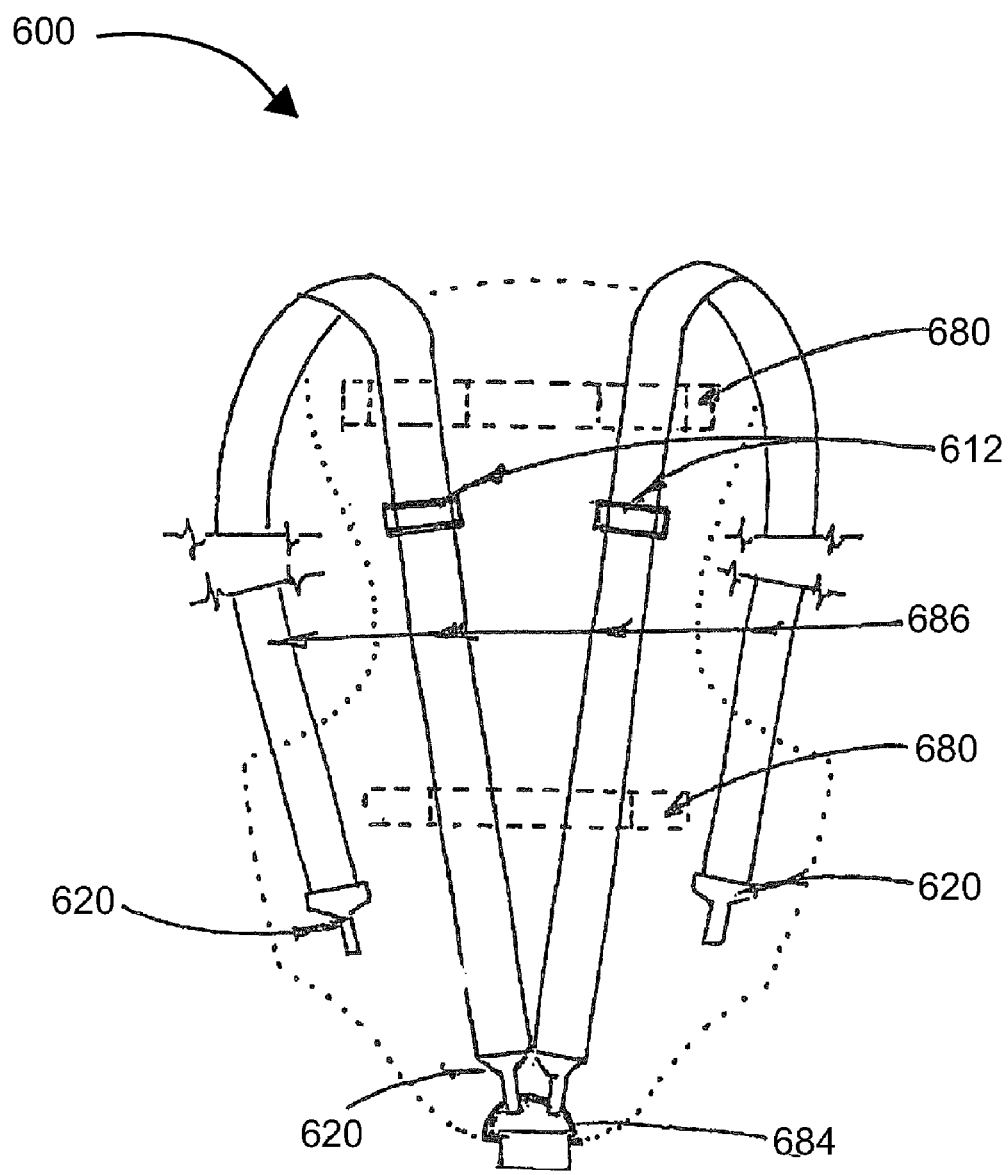
FIG. 6D is a front elevation view of an example swaddle vest with attached shoulder straps to be used in conjunction with a CRS.

FIG. 6C is a front elevation view of an example swaddle vest 600 to be used in conjunction with a CRS. The front half 668 of the swaddle vest 600 is equipped with belt loops 680 running horizontally across a width of the swaddle vest 600 generally in the middle and near the top of the swaddle vest 600. The belt loops 680 are configured for attaching the swaddle vest 600 to a framework of the CRS and optionally for attaching shoulder straps 686 (shown in FIG. 6D).

FIG. 6D is a front elevation view of an example swaddle vest 600 with attached shoulder straps 686 to be used in conjunction with a CRS. The swaddle vest 600 may be used as a child carrier when equipped with shoulder straps 686. The shoulder straps 686 are equipped with hooks 620 that are selectively attached to a ring 684 at the base of the swaddle vest 600. The shoulder straps 686 extend upwardly through belt loops 680 in the middle and near the top of the swaddle vest 600 as depicted in FIG. 6C. The shoulder straps 686 then wrap around the shoulders of a child care provider carrying the child in the swaddle vest 600 and continue to extend downwardly in front of the child care provider's chest where they end with hooks 620 that may be selectively attached to the swaddle vest 600, thus securing the swaddle vest 600 to the child care provider. The shoulder straps 686 may be equipped with adjustors 612 to vary the length of the shoulder straps 686 in accordance with the size of the child care provider.

Figure 7:
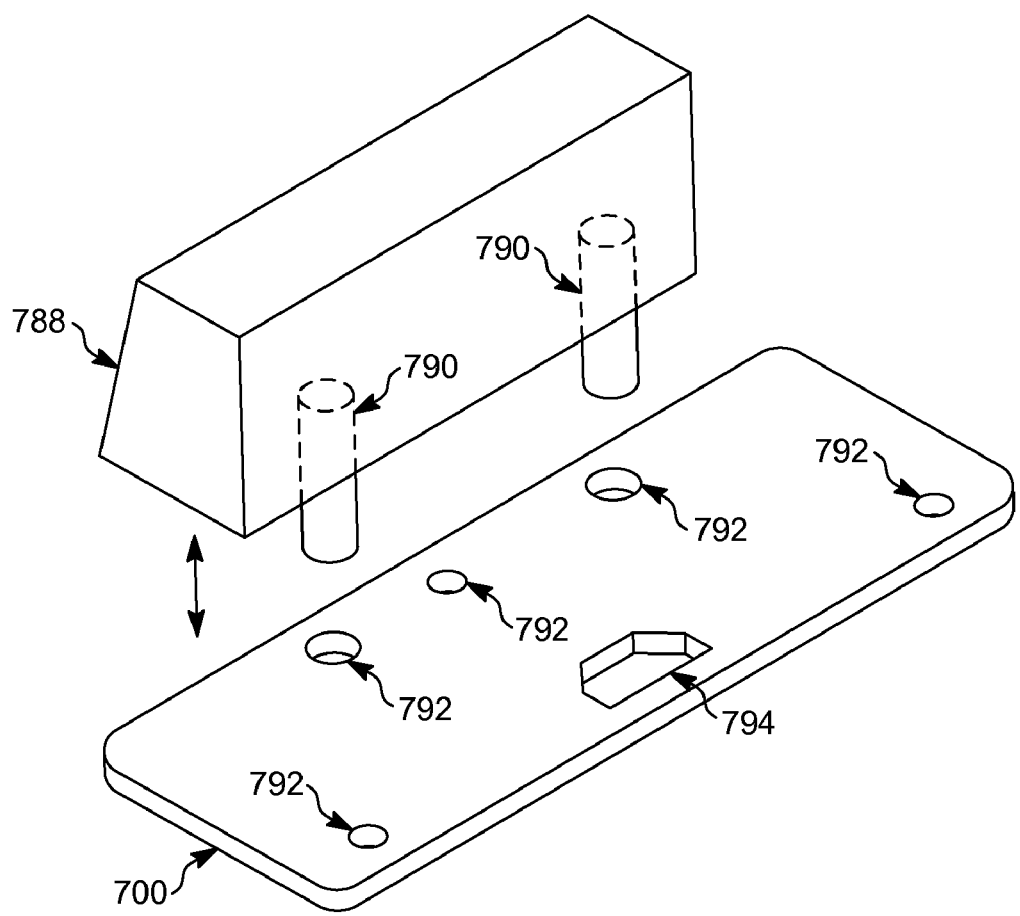
FIG. 7 is an isometric view of an example headrest anchor to be used in conjunction with a CRS.

FIG. 7 is an isometric view of an example headrest anchor 700 to be used in conjunction with a CRS. The headrest anchor 700 comprises a plate, generally made of metal or other structural material, fitted between a top surface of a vehicle seat and a bottom surface of a corresponding seat headrest 788. The headrest anchor 700 is secured by inserting headrest posts 790, typically protruding from the bottom surface of the headrest 788, through bracket apertures 792 in the headrest anchor 700. The headrest posts 790 are then fully inserted in apertures typically found in the top of the corresponding vehicle seat. Consequently, the headrest anchor 700 is prohibited from substantial lateral movement by the bracket apertures 792 and the clamping effect of positioning the headrest anchor 700 directly between the top surface of the vehicle seat and the bottom surface of the seat headrest 788 prevents substantial vertical movement. The position and number of the bracket apertures 792 may vary according to the specific model of vehicle seat. Further, the headrest anchor 700 may include multiple sets of bracket apertures 792 designed for multiple models of vehicle seats. The headrest anchor 700 also includes a CRS aperture 794 for attaching the CRS to the headrest anchor 700.

While discussion of attaching a CRS to a vehicle typically references use of manufacturer installed vehicle latches designed to secure CRSs, other modes of attaching the CRS to the vehicle are contemplated herein. When a vehicle is fairly old, from a foreign country, or not designed for on-road use, the vehicle may not be equipped with manufacturer installed latches. In that case, a user may secure the CRS to user installed latches on the vehicle's interior floorboard, ceiling, or body panels. Further, the user may secure the CRS to vehicle seats and/or seat frames. Still further, the user may utilize the headrest anchor 700 shown in FIG. 7. Any and all of these methods of attachment may be used in place of the latches referenced throughout this disclosure.

Figure 8A:
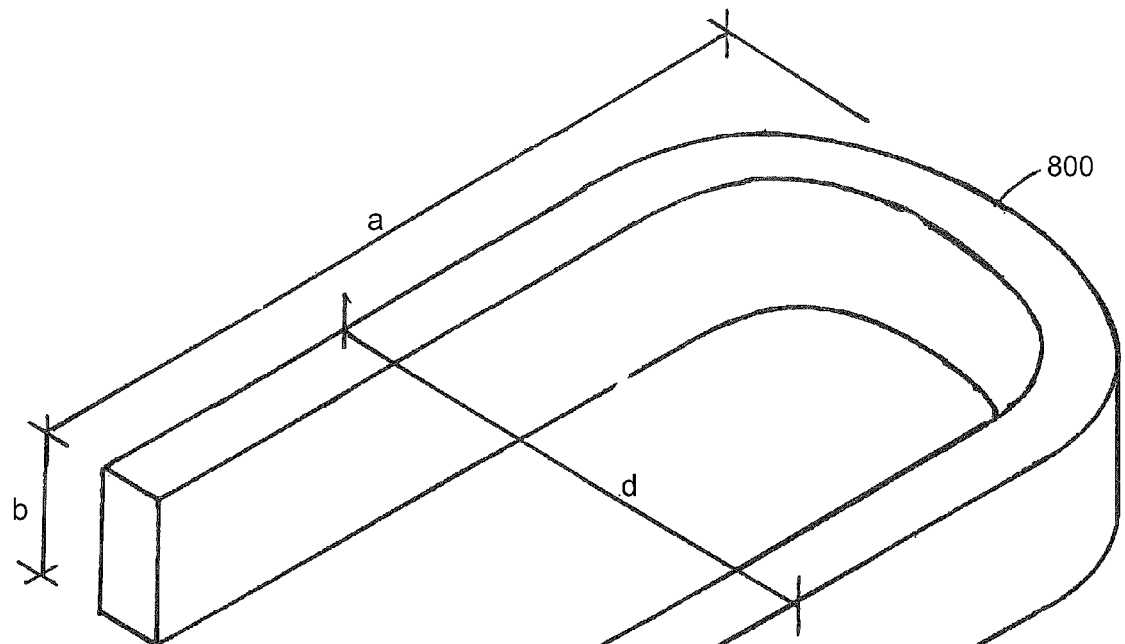
FIG. 8A is an isometric view of an example body containment bumper to be used in conjunction with a CRS.

FIG. 8A is an isometric view of an example body containment bumper 800 to be used in conjunction with a CRS. The bumper 800 is configured to be permanently or selectively attached to a back support and/or framework of a CRS. Various implementations of a selective attachment include, but are not limited to hook-and-loop, buttons, clasps, snaps, and buckles. The bumper 800 extends above the framework to partially surround a restrained child. This configuration helps prevent the child from shifting within the CRS and cushions any shifting that the child experiences caused by an abrupt change in motion of the vehicle. The bumper 800 may be constructed of padding (e.g., foam, batting, and gel), covering (e.g., nylon mesh, cotton fabric, and rubber), and/or reinforcement (e.g. vertical and/or horizontal ribbing, paperboard, and reinforced fabric) as long as the bumper 800 is soft enough to cushion the child's movements and rigid enough to prevent excessive child movements.

While the size and shape of the bumper 800 may vary considerably in various implementations, the bumper 800 of FIG. 8A is horseshoe shaped with a rectangular cross-section. The bumper 800 is approximately 19 inches long and 13 inches wide. The rectangular cross section is approximately 1.5 inches wide by 3 inches tall.

Figure 8B:
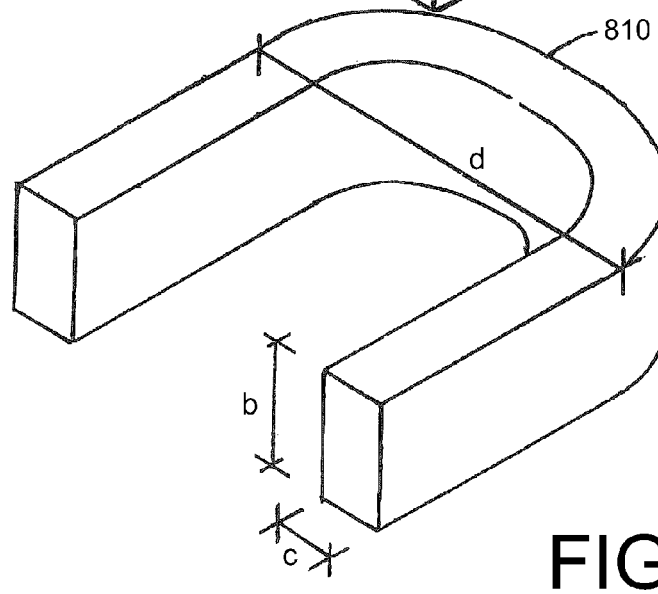
FIG. 8B is an isometric view of a first example head guard to be used in conjunction with a CRS.

FIG. 8B is an isometric view of a first example head guard 810 to be used in conjunction with a CRS. In addition to or in lieu of a body containment bumper 800, the CRS may utilize a head guard 810. The head guard 810 is smaller than the bumper 800 and is designed to cushion and prevent excessive movement of the restrained child's head rather than the child's entire body. In some implementations, the head guard 810 is designed to fit inside the bumper 800 so that both the bumper 800 and the head guard 810 may be used simultaneously in a CRS. In other implementations, the bumper 800 or head guard 810 may be used alone in a CRS.

Similar to the bumper 800, the head guard 810 is configured to be permanently or selectively attached to a back support and/or framework of the CRS. Various implementations of a selective attachment include, but are not limited to hook-and-loop, buttons, clasps, snaps, and buckles. Further, the head guard 810 may be constructed of padding (e.g., foam, batting, and gel), covering (e.g., nylon mesh, cotton fabric, and rubber), and/or reinforcement (e.g. vertical and/or horizontal ribbing, paperboard, and reinforced fabric) as long as the head guard 810 is soft enough to cushion the child's head movements and rigid enough to prevent excessive head movements.

While the size and shape of the head guard 810 may vary considerably in various implementations, the head guard 810 of FIG. 8B is horseshoe shaped with a rectangular cross-section and adapted to fit inside the bumper 800 of FIG. 8A. Consequently, the bumper 800 is approximately 10 inches wide and may be any length less than the 19 inch length of the bumper 800. The rectangular cross section of the head guard 810 is also approximately 1.5 inches wide by 3 inches tall.

Figure 9:
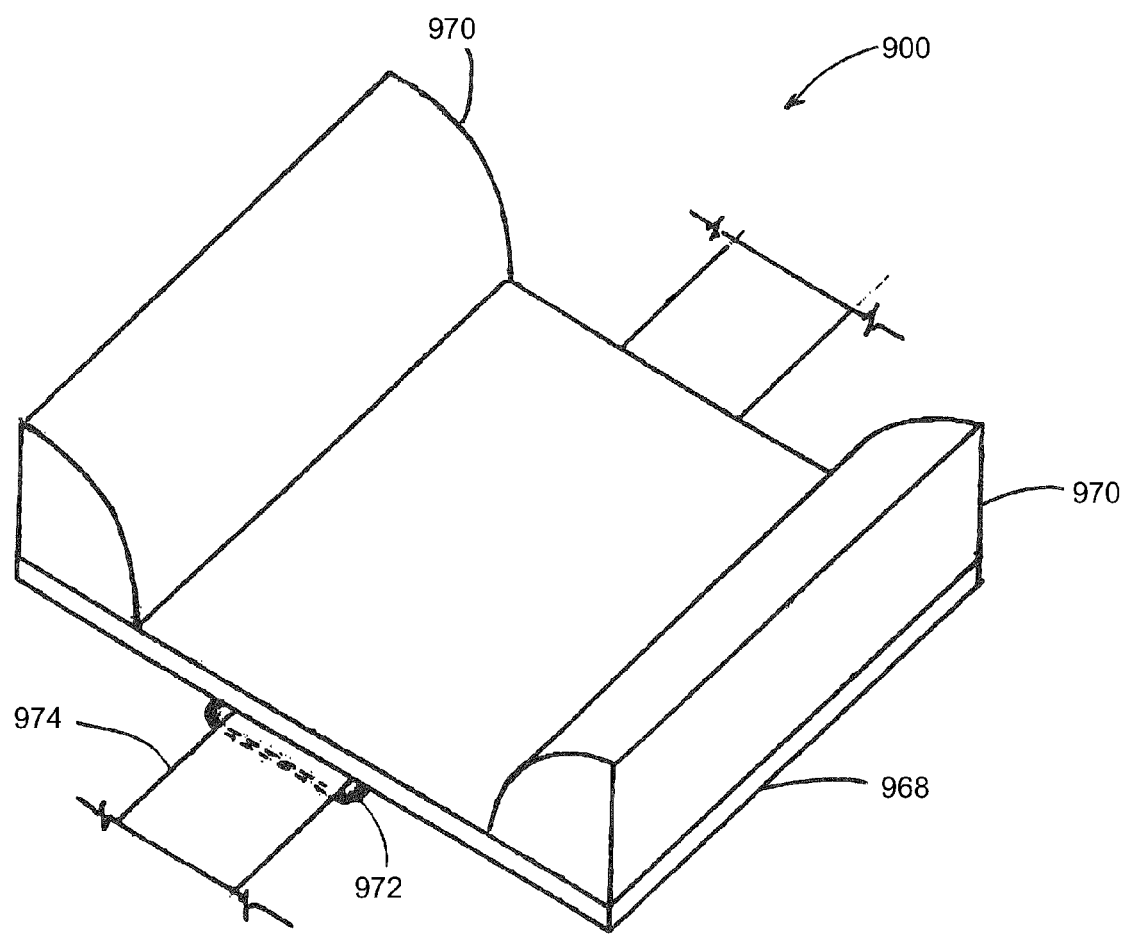
FIG. 9 is an isometric view of a second example head guard to be used in conjunction with a CRS.

FIG. 9 is an isometric view of a second example head guard 900 to be used in conjunction with a CRS. In the implementation of FIG. 9, the head guard 900 includes a flat cushion 968 with curved bolsters 970 on each side. The flat cushion 968 is adapted to rest on a framework and/or back support of the CRS where a restrained child's head is placed. The bolsters 970 extend on each side of the child's head to prevent excessive movement of the child's head and/or cushion movement of the child's head.

Similar to the bumper 800 and head guard 810, head guard 900 is configured to be permanently or selectively attached to a back support and/or framework of the CRS. Various implementations of a selective attachment include, but are not limited to hook-and-loop, buttons, clasps, snaps, and buckles. Further, the head guard 900 may be constructed of padding (e.g., foam, batting, and gel), covering (e.g., nylon mesh, cotton fabric, and rubber), and/or reinforcement (e.g. vertical and/or horizontal ribbing, paperboard, and reinforced fabric) as long as the head guard 900 is soft enough to cushion the child's head movements and rigid enough to prevent excessive head movements.

In the implementation shown in FIG. 9, the head guard 900 utilizes a sleeve 972 adapted to receive a head guard strap 974 attached to the CRS framework and/or back support. The head guard strap 974 may also be a longitudinal strap. This configuration allows the head guard 974 to be easily repositioned longitudinally to a desired eight appropriate to guard the restrained child's head.

The above specification, examples, and data provide a complete description of the structure and use of example implementations of the invention. Although various implementations of the invention have been described above with a certain degree of particularity, or with reference to one or more individual implementations, those skilled in the art could make numerous alterations to the disclosed implementations without departing from the spirit or scope of this invention. Other implementations are therefore contemplated. It is intended that all matter contained in the above description and shown in the accompanying drawings shall be interpreted as illustrative only of particular implementations and not limiting. Changes in detail or structure may be made without departing from the basic elements of the invention as defined in the following claims.

What is claimed is:

1. A child restraint system comprising
a substantially vertical tether strap,
an upper attachment device adjustably attached to a top end of the vertical tether strap for selective attachment to a first vehicle attachment point provided as a structure of a vehicle, and
two shoulder straps positioned on each lateral side of the vertical tether strap;
a substantially lateral strap affixed to the vertical tether strap and the shoulder straps;
a back support affixed to an intermediate portion of the vertical tether strap, respective intermediate portions of the shoulder straps, and the lateral strap; and
a child restraint harness configured to restrain a body of a child from substantial movement within the child restraint system and further comprising;
  a pair of male clasps, each respectively slideably attached to a one of the two shoulder straps along portions of the two shoulder straps extending from a top of the back support;
  a pair of lower attachment devices, each respectively slideably attached to a one of the two shoulder straps along portions of the two shoulder straps extending from a bottom of the back support, wherein the lower attachment devices are configured for respective direct selective attachment to second and third vehicle attachment points provided as structures of the vehicle and located within a crevice between a seatback and a seat bottom of a seat of the vehicle;
  a pair of strap adjusters, each respectively fixedly attached to a one of the two shoulder straps along portions of the two shoulder straps extending from a top of the back support distal from the male clasps and slideably attached to a one of the two shoulder straps along portions of the two shoulder straps extending from a bottom of the back support distal from the lower attachment devices, whereby each of the shoulder straps forms a continuous loop of strapping by a connection of the portions of each shoulder strap with the respective strap adjuster;
  a buckle adjustably attached to a bottom end of the vertical tether strap extending from a bottom of the back support, wherein
  a child is restrained in the child restraint harness by placing each of the child's arms through a respective loop of the shoulder straps, pulling the bottom end of the vertical tether strap between the child's legs, and buckling the male clasps on the shoulder straps within the buckle on the vertical tether strap, thereby forming a groin belt with the vertical tether strap and hip belts with portions of the shoulder straps extending between the male clasps and the lower attachment devices.

2. The child restraint system of claim 1, wherein the top end of the vertical strap is configured for selective attachment to an attachment point positioned at or near a top of a seat back in a vehicle or positioned at or near a bottom of a seat back in a vehicle.

3. The child restraint system of claim 1, further comprising a booster placed on a top of a seat bottom of a vehicle and slideably attached to the shoulder straps, wherein the booster is configured to elevate the child off of the seat bottom.

4. The child restraint system of claim 1, further comprising a head guard placed around the child's head and removably attached to the vertical tether strap or back support, or both, wherein the head guard is configured to prevent or cushion, or both, motion of the child's head.

5. The child restraint system of claim 1, wherein a height of the back support, and thus a height of the shoulder straps, is adjustable vertically by adjusting the position of the upper attachment device on the vertical tether strap and each of the strap adjusters on the shoulder straps to raise or lower the back support to accommodate children of various sizes.

6. A child restraint framework comprising
a longitudinal strap with longitudinal ends;
an adjustment device moveably attached to the longitudinal strap to adjust a length of the longitudinal strap;
an attachment device affixed to a first longitudinal end of the longitudinal strap for direct selective attachment to an attachment structure of a vehicle on or behind a rear seatback of a vehicle;
two or more lateral straps affixed directly to the longitudinal strap;
a back support affixed to the longitudinal strap and to two or more of the two or more lateral straps;
two crevice straps, each with a first longitudinal end and a second longitudinal end, wherein
the first longitudinal ends are directly connected to the back support, one or more of the lateral straps, or both, and
the crevice straps are configured to extend along a front of the rear seatback;
an attachment device affixed to each second longitudinal end of the crevice straps, wherein the attachment device is configured for direct selective attachment to a respective attachment structure of the vehicle at or near a bottom of the rear seatback of the vehicle; and
a child restraint harness configured to restrain a body of a child from substantial movement within the child restraint harness and wherein the child restraint harness is attached to the longitudinal strap, the crevice straps, or both.

7. The child restraint system of claim 6, wherein the child restraint harness includes
a hip strap configured to wrap around the child's hips or waist, or both, and engage with a harness buckle in front of the child's groin.

8. The child restraint system of claim 7, wherein the child restraint harness further includes two shoulder straps operatively connected to the longitudinal strap and wherein the two shoulder straps are configured to wrap around the child's shoulders and engage with the harness buckle or hip strap, or both.

9. The child restraint system of claim 8, wherein the child restraint harness further includes
a groin strap affixed to the longitudinal strap and wherein the groin strap is configured to extend between the child's legs adjacent the child's groin and engage with the harness buckle, hip strap, and/or shoulder straps; and
an adjustment device attached to the groin strap to adjust a length of the groin strap.

10. The child restraint system of claim 9, wherein the harness buckle is configured to selectively connect two or more of the two shoulder straps, the hip strap, or the groin strap together.

11. The child restraint system of claim 9, wherein the child restraint harness further includes an adjustment device attached to each of the shoulder straps or the hip strap, or both, to adjust a length of each of the shoulder straps or the hip strap, or both.

\* \* \* \* \*